United States Patent
Wentink et al.

(10) Patent No.: US 9,807,764 B2
(45) Date of Patent: *Oct. 31, 2017

(54) COMPENSATION FOR EXCESS TRANSMISSION OPPORTUNITY TIME

(71) Applicant: QUALCOMM Incorporated, San Diego, CA (US)

(72) Inventors: Maarten Menzo Wentink, Naarden (NL); Marco Papaleo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,512

(22) Filed: Jun. 20, 2016

(65) Prior Publication Data

US 2017/0013616 A1 Jan. 12, 2017

Related U.S. Application Data

(60) Provisional application No. 62/190,887, filed on Jul. 10, 2015, provisional application No. 62/266,465, filed on Dec. 11, 2015, provisional application No. 62/288,939, filed on Jan. 29, 2016, provisional application No. 62/318,472, filed on Apr. 5, 2016.

(51) Int. Cl.
*H04W 72/04* (2009.01)
*H04W 74/08* (2009.01)
*H04W 84/12* (2009.01)

(52) U.S. Cl.
CPC ....... *H04W 72/0446* (2013.01); *H04W 74/08* (2013.01); *H04W 74/0816* (2013.01); *H04W 84/12* (2013.01)

(58) Field of Classification Search
None
See application file for complete search history.

(56) References Cited

U.S. PATENT DOCUMENTS

2006/0280151 A1 12/2006 Sawada
2014/0078970 A1* 3/2014 Guo .................... H04W 72/005
                                                    370/329
2015/0016437 A1 1/2015 Wentink

FOREIGN PATENT DOCUMENTS

WO WO-2015127382 8/2015

OTHER PUBLICATIONS

Deng Q., et al., "A TXOP-Based Scheduling Algorithm for Video Transmission in IEEE 802.11e Networks," 6th International Conference on ITS Telecommunications Proceedings, 2006, pp. 573-576, XP031012489, Institute of Electrical and Electronics Engineers.

(Continued)

*Primary Examiner* — Christine Duong
(74) *Attorney, Agent, or Firm* — Holland & Hart LLP

(57) ABSTRACT

Methods, systems, and devices are described for efficient use of transmit opportunities (TXOPs) through adjustment of contention window backoff time values to compensate for one or more TXOPs that may exceed a TXOP limit. A contention window value may be increased, for example, to provide other devices in the network with a fair opportunity for network access based at least in part on one or more TXOPs that exceed the TXOP limit. Allowing one or more transmissions to exceed a TXOP limit may provide enhanced efficiency as compared to having multiple transmissions.

30 Claims, 14 Drawing Sheets

(56) References Cited

OTHER PUBLICATIONS

ISA/EP, International Search Report and Written Opinion of the International Searching Authority, Int'l Application No. PCT/US2016/038557, dated Oct. 19, 2016, European Patent Office, Rijswijk, NL, 14 pgs.

Luo L., et al., "Achieving Temporal Fairness in Multi-Rate 802.11 WLANs with Capture Effect," Proceedings of IEEE International Conference on Communications, 2008, pp. 2496-2501, XP031265794, Institute of Electrical and Electronics Engineers.

* cited by examiner

COMPENSATION FOR EXCESS TRANSMISSION OPPORTUNITY TIME

CROSS REFERENCES

The present Application for Patent claims priority to U.S. Provisional Patent Application No. 62/190,887 by Wentink, et al., entitled "Compensation For Excess Transmission Opportunity Time," filed Jul. 10, 2015; and to U.S. Provisional Patent Application No. 62/266,465 by Wentink, et al., entitled "Compensation For Excess Transmission Opportunity Time", filed Dec. 11, 2015, and to U.S. Provisional Patent Application No. 62/288,939 by Wentink, et al., entitled, "Compensation For Excess Transmission Opportunity Time", filed Jan. 29, 2016, and to U.S. Provisional Patent Application No. 62/318,472, by Wentink, et al., entitled, "Compensation For Excess Transmission Opportunity Time", filed Apr. 5, 2016 and assigned to the assignee hereof.

BACKGROUND

Field of the Disclosure

The following relates generally to wireless communication, and more specifically to compensating for utilized transmission times relative to a transmission opportunity (TXOP) limit.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless communications network may include a number of network devices such as access points (APs) that can support communication for a number of wireless devices. A wireless device may communicate with a network device bi-directionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In WLANs, there may be cases in which multiple STAs are in communication with a particular AP. Access to the wireless medium may be controlled through a medium access control (MAC), which may allow different STAs to access a wireless channel according to enhanced distributed channel access (EDCA) rules. Included in the EDCA rules is a transmit opportunity (TXOP) limit, which is a duration of time during which a STA is allowed to continually access the medium without backoff. A wireless network may have multiple different access priorities according to an access class of data that is transmitted using the wireless channel, each of which may have a different TXOP limit.

In order to enhance utilization of the wireless network, it may be desirable for different wireless devices accessing the wireless network to utilize relatively fewer TXOPs that each contain more transmitted data rather than relatively more TXOPs that each contain less transmitted data. For example, exceeding a TXOP limit may improve the efficiency when sounding or protection overhead needs to be amortized in a TXOP. Furthermore, in some cases, a TXOP limit may be set to zero for certain types of transmissions (e.g., Best Effort transmission priority transmissions), which implies that a single data transmission can take place. However, for low physical (PHY) layer data rates (such as 1 Mbps), this may cause relatively long transmissions, hence enhanced efficiency may be desirable in such cases.

SUMMARY

Various methods, systems, devices, and apparatuses are described for enhanced network utilization in a wireless communications system through efficient transmissions of information between an AP and a station. Fair and efficient use of transmit opportunities (TXOPs) may be enhanced through adjustment of contention window (CW) backoff time values to compensate for one or more TXOPs that may exceed a TXOP limit that is set by the network. A CW value may be increased, for example, to provide other devices in the network with a fair opportunity for network access based at least in part on one or more TXOPs that exceed the TXOP limit. Allowing one or more transmissions to exceed a TXOP limit may provide enhanced efficiency as compared to having multiple transmissions, each with related overhead, that are each within the TXOP limit.

Compensation may be achieved at a station in a wireless communications network, according to certain examples, through determination of a utilization of a transmit opportunity (TXOP), and determination of a difference between the utilization of the TXOP and a TXOP limit. The difference between the utilization of the TXOP and TXOP limit may be aggregated with an accumulated difference between at least one TXOP and the TXOP limit. Based at least in part on the accumulated difference, a contention window (CW) value may be adjusted for a subsequent transmission from the wireless communication device. The accumulated difference may then be adjusted based at least in part on the adjusted CW value. Less than fully utilized TXOPs may be used to compensate for later TXOPs that may exceed the TXOP limit. Compensation of CW values may be through linear or exponential compensation, according to various examples.

A first method for wireless communications may include determining a utilization of a transmit opportunity (TXOP) for a transmission of data from a wireless communication device; determining a difference between the utilization of the TXOP and a TXOP limit; and aggregating the difference with an accumulated difference between at least one other TXOP and a TXOP limit for the other TXOP. The method may also include adjusting a contention window (CW) value for a subsequent transmission from the wireless communication device based at least in part on the accumulated difference. The method may also include, in some examples, updating the accumulated difference based at least in part on the adjusted CW value, based at least in part on a realized TXOP time obtained using the adjusted CW value, or based at least in part on the adjustment to the CW value. Adjusting the CW value may include, for example, determining a relative excess between the accumulated difference and the TXOP limit, or scaling the minimum CW value based at least in part on the relative excess. Additionally or alternatively, the method may include determining a second utilization of a subsequent TXOP during a subsequent transmission of data from the wireless communication device; determining a second difference between the second utilization of the subsequent TXOP and the TXOP limit; and secondly aggregating the second difference with the accumulated difference. Rather than adjusting the CW value, the method may include adjusting a random backoff value for a subsequent transmission from the wireless communication device based at least in part on the accumulated difference.

A second method for wireless communications may include determining an accumulated difference between a utilization of one or more transmit opportunities (TXOPs) for a transmission of data from a wireless communication device and a TXOP limit; adjusting a contention window (CW) value for a subsequent transmission from the wireless communication device based at least in part on the determining; and updating the accumulated difference based at least in part on the adjusted CW value. Adjusting the CW value may include determining a relative excess between the accumulated difference and a minimum CW value; and adjusting the CW value based at least in part on the relative excess.

Adjusting the CW value may include exponentially increasing the CW value when the relative excess is greater than a predetermined value, which may correspond, for example, to an integer multiple of the TXOP limit. Exponentially increasing the CW value comprises increasing the CW value by an exponential factor that is based at least in part on the integer multiple. Adjusting the CW value may include linearly increasing the CW value when the relative excess is greater than a predetermined value. Linearly increasing the CW value may include, for example, multiplying the relative excess by the minimum CW value; and rounding down to a next integer CW value.

Adjusting the CW value may include decreasing the CW value when the accumulated difference is less than a predetermined value. The predetermined value may be determined, for example, based at least in part on a ratio of the accumulated difference and the TXOP limit. Decreasing the CW value may include, for example, multiplying the ratio by a minimum CW value; and rounding down to a next integer CW value. Adjusting the CW value may include increasing the CW value to allow for increased utilization of a subsequent TXOP relative to the TXOP limit.

A third method for wireless communications may include determining a utilization of a transmit opportunity (TXOP) for a transmission of data from a wireless communication device; determining a difference between the utilization of the TXOP and a TXOP limit; aggregating the difference with an accumulated difference between at least one other TXOP and a TXOP limit for the other TXOP; and setting initial contention windows (CWs) such that a ratio between an average CW and an average sum of the TXOP limit and the accumulated difference equals a ratio between a minimum CW and the TXOP limit.

A communications device for wireless communications may include a utilization monitor configured to determine a utilization of a transmit opportunity (TXOP) for a transmission of data from a wireless communication device and determine a difference between the utilization of the TXOP and a TXOP limit; and an aggregator configured to aggregate the difference with an accumulated difference between at least one other TXOP and a TXOP limit for the other TXOP.

The communications device may implement one or more aspects of the first, second, or third methods described above.

A communications device for wireless communications may include a utilization monitor configured to determine an accumulated difference between a utilization of one or more transmit opportunities (TXOPs) for a transmission of data from a wireless communication device and a TXOP limit; a contention window (CW) adjuster configured to adjust a CW value for a subsequent transmission from the wireless communication device based at least in part on the determining; and an update unit configured to update the accumulated difference based at least in part on the adjusted CW value.

The communications device may implement one or more aspects of the first, second, or third methods described above.

A communications device for wireless communications may include a utilization monitor configured to determine an accumulated difference between a utilization of one or more transmit opportunities (TXOPs) for a transmission of data from a wireless communication device and a TXOP limit; a contention window (CW) adjuster configured to adjust a CW value for a subsequent transmission from the wireless communication device based at least in part on the determining; and an update unit configured set initial contention window (CWs) such that a ratio between an average CW and an average sum of the TXOP limit and the accumulated difference equals a ratio between a minimum CW and the TXOP limit.

The communications device may implement one or more aspects of the first, second, or third methods described above.

A communications device for wireless communications may include means for determining a utilization of a transmit opportunity (TXOP) for a transmission of data from a wireless communication device; means for determining a difference between the utilization of the TXOP and a TXOP limit; and means for aggregating the difference with an accumulated difference between at least one other TXOP and a TXOP limit for the other TXOP.

The communications device may include means for implementing one or more aspects of the first, second, or third methods described above.

A communications device for wireless communications may include means for determining an accumulated difference between a utilization of one or more transmit opportunities (TXOPs) for a transmission of data from a wireless communication device and a TXOP limit; means for adjusting a contention window (CW) value for a subsequent transmission from the wireless communication device based at least in part on the determining; and means for updating the accumulated difference based at least in part on the adjusted CW value.

The communications device may include means for implementing one or more aspects of the first, second, or third methods described above.

A communications device for wireless communications may include means for determining a utilization of a transmit opportunity (TXOP) for a transmission of data from a wireless communication device; means for determining a difference between the utilization of the TXOP and a TXOP limit; means for aggregating the difference with an accumulated difference between at least one other TXOP and a TXOP limit for the other TXOP; and means for setting initial contention windows (CWs) such that a ratio between an average CW and an average sum of the TXOP limit and the accumulated difference equals a ratio between a minimum CW and the TXOP limit.

The communications device may include means for implementing one or more aspects of the first second, or third methods described above.

A non-transitory computer-readable medium may store instructions executable by a processor to cause at least one device to: determine a utilization of a transmit opportunity (TXOP) for a transmission of data from a wireless communication device; determine a difference between the utilization of the TXOP and a TXOP limit; and aggregate the difference with an accumulated difference between at least one other TXOP and a TXOP limit for the other TXOP.

The instructions may be further executable by the processor to cause the at least one device to implement one or more aspects of the first, second, or third methods or devices described above.

A non-transitory computer-readable medium may store instructions executable by a processor to cause at least one device to: determine an accumulated difference between a utilization of one or more transmit opportunities (TXOPs) for a transmission of data from a wireless communication device and a TXOP limit; adjust a contention window (CW) value for a subsequent transmission from the wireless communication device based at least in part on the determination; and update the accumulated difference based at least in part on the adjusted CW value.

The instructions may be further executed by the processor to cause the at least one device to implement one or more aspects of the first, second, or third methods or devices described above.

A non-transitory computer-readable medium may store instructions executable by a processor to cause at least one device to: determine a utilization of a transmit opportunity (TXOP) for a transmission of data from a wireless communication device; determine a difference between the utilization of the TXOP and a TXOP limit; aggregate the difference with an accumulated difference between at least one other TXOP and a TXOP limit for the other TXOP; and set initial contention windows (CWs) such that a ratio between an average CW and an average sum of the TXOP limit and the accumulated difference equals a ratio between a minimum CW and the TXOP limit.

The instructions may be further executable by the processor to cause the at least one device to implement one or more aspects of the first, second, or third methods or devices described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
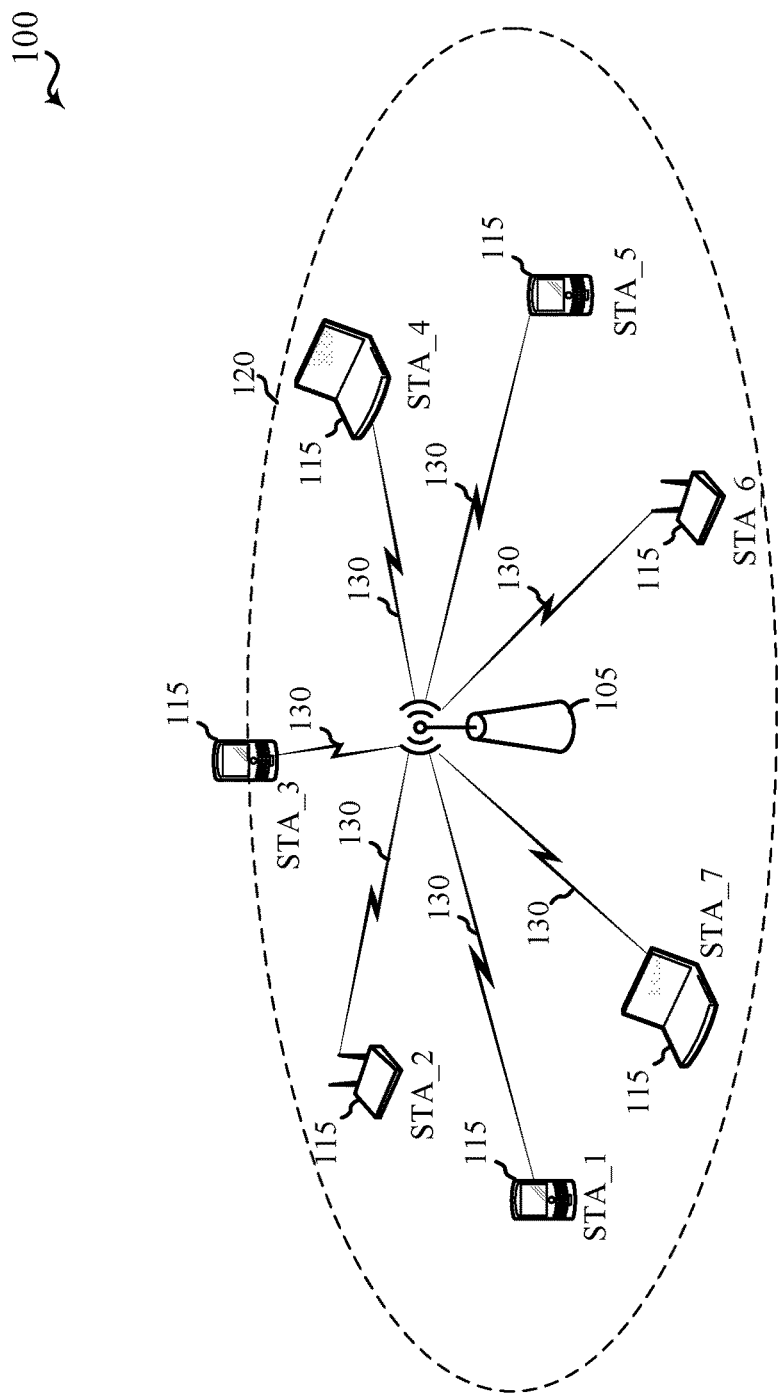
FIG. 1 shows a diagram that illustrates an example of a wireless local area network (WLAN) that supports power conservation modes according to various examples.

Described examples are directed to methods, systems, devices, and apparatuses for accessing a wireless channel in a wireless communications network that may enhance network utilization and power conservation through efficient transmissions of information between an AP and a station. Efficient use of transmit opportunities (TXOPs) may be enhanced through adjustment of contention window (CW) backoff time values to compensate for one or more TXOPs that may exceed a TXOP limit that is set by the network. A CW value may be increased, for example, to provide other devices in the network with a fair opportunity for network access based at least in part on one or more TXOPs that exceed the TXOP limit. Allowing one or more transmissions to exceed a TXOP limit may provide enhanced efficiency as compared to having multiple transmissions, each with related overhead, that are each within the TXOP limit.

Compensation may be achieved, according to certain examples, through determination of a utilization of a transmit opportunity (TXOP), and determination of a difference between the utilization of the TXOP and a TXOP limit. The difference between the utilization of the TXOP and TXOP limit may be aggregated with an accumulated difference between at least one TXOP and the TXOP limit. Based at least in part on the accumulated difference, a contention window (CW) value may be adjusted for a subsequent transmission from the wireless communication device. The accumulated difference may then be adjusted based at least in part on the adjusted CW value. Less than fully utilized TXOPs may be used to compensate for later TXOPs that may exceed the TXOP limit. Compensation of CW values may be through linear or exponential compensation, according to various examples.

The channel access techniques presented herein are generally described in connection with WLANs for simplicity. A WLAN (or Wi-Fi network) may refer to a network that is based at least in part on the protocols described in the various IEEE 802.11 standards (e.g., 802.11a/g, 802.11n, 802.11ac, 802.11ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a WLAN or Wi-Fi network 100 is shown that is configured to provide enhanced network utilization. The WLAN 100 includes an AP 105 and multiple associated stations 115. In this example, there are shown seven (7) stations or STAs 115, which are identified as STA_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS). The various stations 115 in the BSS are able to communicate with one another through the AP 105. Also shown is a coverage area 120 of the AP 105, which may represent a basic service area (BSA) of the WLAN 100. Although not shown in FIG. 1, the BSS associated with the WLAN 100 is typically connected to a wired or wireless distribution system (DS) that allows multiple APs to be connected in an extended service set.

The AP 105 is configured to communicate bi-directionally with each of the stations 115 using transmissions 130. The transmissions 130 may include downlink transmissions (e.g., beacon frames) that are sent from the AP 105 to a station 115 as well as uplink transmissions of data frames that are sent from a station 115 to the AP 105, which are referred to as transmission opportunities (TXOPs). Different stations 115 transmitting, using the wireless medium, simultaneously may result in collisions in transmissions, a large number of which may degrade the efficiency of the network 100. Following a TXOP, a station 115 waits for a backoff period prior to attempting to another transmission. The backoff period may be set based at least in part on a contention window (CW) value that is defined for the network 100, as a value between a minimum CW value (CWmin) and a maximum CW value (CWmax), as will be described in more detail below. Collisions between stations 115 may be resolved according to contention mechanisms that result in the stations 115 attempting retransmissions following backoff periods that increase following each detection of a collision. A station 115 that sends many short TXOPs separated by a backoff may have a higher contention activity than a station 115 that groups traffic into longer but fewer TXOPs. The latter may be implemented according to various techniques described in more detail below, resulting in relatively longer TXOPs that may exceed an established TXOP limit, and which may be compensated through increased contention window (CW) backoff values. This may result in enhanced network efficiency through reduced relative overhead, as well as reduced power consumption of both the stations 115 and AP 105.

The backoff counter is determined as a random integer drawn from a uniform distribution over the interval [0,CW]. The CW size, according to various examples, may be calculated according to different techniques in order to enhance network efficiency while maintaining required QoS for an access class, as will be described in further detail below. If the channel becomes busy during a backoff process, the backoff counter is suspended. When the channel becomes idle again, and stays idle for an extra distributed coordination function (DCF) interframe space (DIFS) time interval, the backoff process resumes with the suspended backoff counter value.

For each successful reception of a frame, the receiving station immediately acknowledges by sending an acknowledgement (ACK) frame. The ACK frame is transmitted after a short interframe space (SIFS), which is shorter than the DIFS, and thus does not result in other stations attempting to gain access to the medium. Other stations resume the backoff process after the DIFS idle time. If an ACK frame is not received after the data transmission, the frame is retransmitted after another random backoff. Following the expiration of the backoff counter, station 115 may transmit a request to send (RTS). In the event that there is no collision with another station 115, the AP 105 may send a clear to send (CTS) indication to the station 115. Station 115 may then transmit data to the AP 105, and the process then repeats. The CW may be reset after a successful TXOP to a minimum CW size (CWmin), where CWmin is the minimum contention window for the access category (AC) for which the TXOP was obtained. The contention window that is used after a successful TXOP is referred to as the initial CW.

Fairness in channel access may be maintained through adjustment of the initial CW. For example, 802.11b transmissions may consume a relatively high amount of airtime because even a single data MPDU can occupy the medium for about 12 ms, which is a significant amount of time relative to an OFDM transmission of 2 ms, for example. Another potential source of channel access unfairness may be caused by an aggregated MPDU (A-MPDU). An A-MPDU at a low rate may cause a very long transmission, similar to an 802.11b transmission. In order to restore channel access fairness, an EDCA TXOP limit can be set to a non-zero value, thus limiting transmissions to a maximum duration established by the TXOP limit. However, in certain cases it may be beneficial to extend certain transmissions beyond the TXOP limit, in order to capitalize on fresh sounding information or to amortize TXOP related overhead such as RTS/CTS protection and acknowledgements.

According to certain examples, TXOPs that exceed the TXOP limit can be exchanged for a longer average backoff, thus offsetting the excess channel usage time by an increased time period during which the station 115 does not attempt channel access. The compensation, according to examples, may be such that the average amount of airtime between devices that do and those that do not exceed the TXOP limit is about the same, on average. A station 115 may keep track of the excess TXOP time for transmissions that exceed the TXOP limit. For example, after each TXOP, the time the TXOP takes beyond the TXOP limit is added to the excess TXOP time. Additionally or alternatively, before a TXOP, the time the TXOP will take beyond the TXOP limit may be added to the excess TXOP time. Increasing the CW value may include exponentially increasing the CW value when the relative excess is greater than a predetermined value, such as when the relative excess corresponds to an integer multiple of the TXOP limit, in which case the CW value may be adjusted by increasing the CW value by an exponential factor that is based at least in part on the integer multiple. Adjusting the CW value may include linearly increasing the CW value when the relative excess is greater than a predetermined value. Various examples of CW adjustment based at least in part on TXOP times will be described with respect to FIGS. 2-11.

Figure 2:
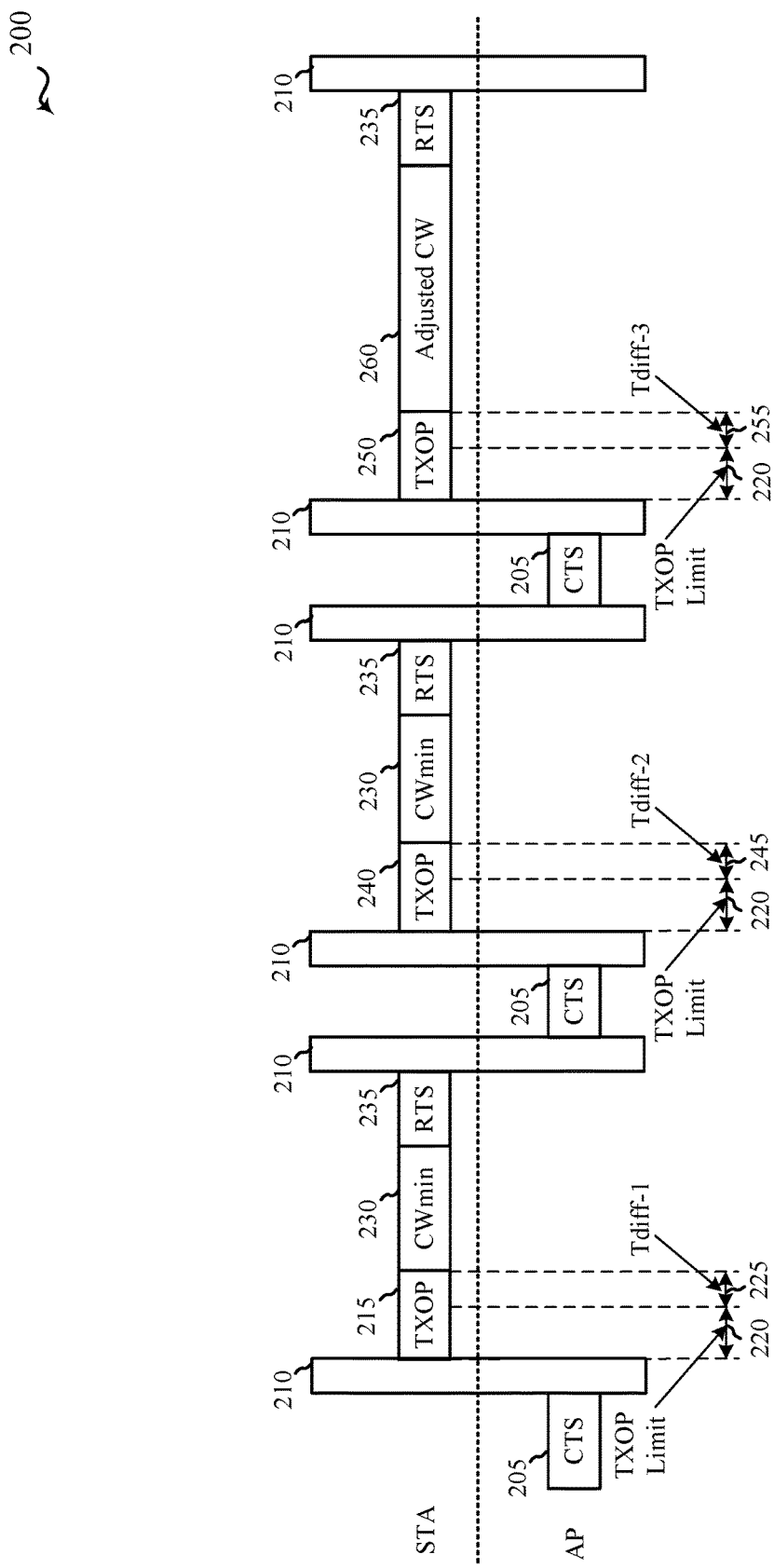
FIG. 2 shows a diagram that illustrates an example of data transmission between an AP and a station according to various examples.

With reference now to FIG. 2, an example 200 of transmissions between a station and an AP, such as between a station 115 and AP 105 of FIG. 1, according to various examples is described. Station and AP may implement RTS/CTS techniques, and may adjust a CW value based at least in part on utilization of one or more TXOPs. Alternatively, a station may initiate a TXOP directly, and in the absence of an ACK from the AP following a first frame may determine that a collision has occurred. In FIG. 2, the AP sends a CTS 205 to station. After a SIFS, 210, the station may initiate TXOP 215 to transmit data. A TXOP limit 220 may be established by the AP, and the TXOP 215 in this example exceeds the TXOP limit 220 by an amount Tdiff-1 225.

As mentioned above, in certain examples TXOPs that exceed the TXOP limit can be exchanged for a longer average backoff, which may be accomplished through increasing a CW value. The compensation provided, in certain examples, may be such that the average amount of airtime between devices that do exceed the TXOP limit 220 and those that do not exceed the TXOP limit 220 is about the same, on average. To this end, in examples, the STA may keep track of the excess TXOP times through accumulation of multiple Tdiff values from multiple TXOPs. A CW may be adjusted when an accumulated excess TXOP time exceeds a certain value.

Continuing with the example of FIG. 2, the station waits a backoff time based at least in part on CWmin 230, and sends RTS 235. Following SIFS 210, in this example, access point sends CTS 205, and the station initiates TXOP 240 following another SIFS 210. Again, in this example, TXOP 240 exceeds the TXOP limit 220 by an amount Tdiff-2 245, and the station may aggregate Tdiff-1 225 and Tdiff-2 245 to determine an accumulated excess TXOP time. Continuing with the example of FIG. 2, this process repeats when the station initiates TXOP 250 which exceeds the TXOP limit 220 by an amount Tdiff-3 255. The accumulated excess TXOP time may be large enough to initiate an adjusted CW 260, in which the initial CW value is increased in order to compensate for the accumulated excess TXOP time. The adjustment of the CW value may be accomplished using one of a number of available techniques. The CW value may be linearly scaled based at least in part on the amount of excess TXOP time relative to the TXOP limit. The CW value may also be exponentially increased based at least in part on the amount of excess TXOP time relative to the TXOP limit.

If the CW value is exponentially increased based at least in part on the amount of excess TXOP time relative to the TXOP limit, the CW value may be determined based at least in part on a number of determinations. Such exponential increases for CW values may be used, for example, in systems where CW values are set according to $2^X-1$ (e.g., CW values may be 0, 3, 7, 15, 31, 53, and so on). Initially, an amount of relative excess TXOP time may be determined based at least in part on the accumulated excess TXOP time and the TXOP limit according to the equation:

$$\text{relative excess } TXOP \text{ time} = \frac{\text{excess } TXOP \text{ time}}{TXOP \text{ limit}}. \quad \text{(Eq. 1)}$$

An order of the excess TXOP time may then be determined according to the equation:

$$\text{excess TXOP order} = \text{floor}(\log_2 (\text{relative excess TXOP time}+1), 1) \quad \text{(Eq. 2)}.$$

The CW for the initial backoff following each TXOP may then be determined according to the equation:

$$\text{adjusted CW} = (\text{CWmin}+1) \times 2^{(\text{excess TXOP order})-1} \quad \text{(Eq. 3)}.$$

After the adjustment of the CW, the excess TXOP time may be updated according to the equation:

$$\text{excess TXOP time} = \text{excess TXOP time} - (2^{(\text{excess TXOP order})} \times \text{TXOP limit}) - \text{TXOP limit} \quad \text{(Eq. 4)}.$$

Tables 1-3 provide a number of numerical examples based at least in part on different values of CWmin, different TXOP limits, and different realized TXOP times. In Table 1, CWmin is set to 15 slots, the TXOP limit is set to 2 ms, and each realized TXOP is 2.5 ms. Thus, each TXOP exceeds the TXOP limit by 25%, resulting in a relative excess TXOP time of 0.25 for each TXOP, according to Eq. 1. As discussed above, the excess TXOP time may be accumulated and thus every fourth TXOP the accumulated excess TXOP corresponds to a relative excess TXOP time of 1.0, which would increase the excess TXOP order according to Eq. 2. The adjusted CW value is determined for each TXOP according to Eq. 3, and thus increases by an order of magnitude every fourth TXOP in this example. Following a CW adjustment, the excess TXOP time is updated according to Eq. 4, and in the example of Table 1 is reset to zero following every fourth TXOP.

TABLE 1

| TXOP# | CWmin (slots) | TXOP limit | realized TXOP | excess TXOP time | relative excess TXOP time | order | CW for next initial TXOP | next excess TXOP time |
|---|---|---|---|---|---|---|---|---|
| 1 | 15 | 2 | 2.5 | 0.5 | 0.25 | 0 | 15 | 0.5 |
| 2 | 15 | 2 | 2.5 | 1.0 | 0.50 | 0 | 15 | 1.0 |
| 3 | 15 | 2 | 2.5 | 1.5 | 0.75 | 0 | 15 | 1.5 |
| 4 | 15 | 2 | 2.5 | 2.0 | 1.00 | 1 | 31 | 0.0 |
| 5 | 15 | 2 | 2.5 | 0.5 | 0.25 | 0 | 15 | 0.5 |
| 6 | 15 | 2 | 2.5 | 1.0 | 0.50 | 0 | 15 | 1.0 |
| 7 | 15 | 2 | 2.5 | 1.5 | 0.75 | 0 | 15 | 1.5 |
| 8 | 15 | 2 | 2.5 | 2.0 | 1.00 | 1 | 31 | 0.0 |
| 9 | 15 | 2 | 2.5 | 0.5 | 0.25 | 0 | 15 | 0.5 |
| 10 | 15 | 2 | 2.5 | 1.0 | 0.50 | 0 | 15 | 1.0 |
| 11 | 15 | 2 | 2.5 | 1.5 | 0.75 | 0 | 15 | 1.5 |

In Table 2, CWmin is again set to 15 slots; the TXOP limit is set to 2 ms; and each realized TXOP is 2.2 ms. Thus, each TXOP exceeds the TXOP limit by 10%, resulting in a relative excess TXOP time of 0.10 for each TXOP, according to Eq. 1. Thus, in every tenth TXOP the accumulated excess TXOP corresponds to, in this example, a relative excess TXOP time of 1, which would increase the excess TXOP order according to Eq. 2. The adjusted CW value is determined for each TXOP according to Eq. 3, and thus increases by an order of magnitude every tenth TXOP in this example. Following a CW adjustment, the excess TXOP time is updated according to Eq. 4, and in the example of Table 1 is reset to zero following every tenth TXOP.

TABLE 2

| TXOP# | CWmin (slots) | TXOP limit | realized TXOP | excess TXOP time | relative excess TXOP time | order | CW for next initial TXOP | next excess TXOP time |
|---|---|---|---|---|---|---|---|---|
| 1 | 15 | 2 | 2.2 | 0.2 | 0.10 | 0 | 15 | 0.2 |
| 2 | 15 | 2 | 2.2 | 0.4 | 0.20 | 0 | 15 | 0.4 |
| 3 | 15 | 2 | 2.2 | 0.6 | 0.30 | 0 | 15 | 0.6 |
| 4 | 15 | 2 | 2.2 | 0.8 | 0.40 | 1 | 15 | 0.8 |
| 5 | 15 | 2 | 2.2 | 1.0 | 0.50 | 0 | 15 | 1.0 |
| 6 | 15 | 2 | 2.2 | 1.2 | 0.60 | 0 | 15 | 1.2 |
| 7 | 15 | 2 | 2.2 | 1.4 | 0.70 | 0 | 15 | 1.4 |
| 8 | 15 | 2 | 2.2 | 1.6 | 0.80 | 0 | 15 | 1.6 |
| 9 | 15 | 2 | 2.2 | 1.8 | 0.90 | 0 | 15 | 1.8 |
| 10 | 15 | 2 | 2.2 | 2.0 | 1.00 | 1 | 31 | 0.0 |
| 11 | 15 | 2 | 2.2 | 0.2 | 0.10 | 0 | 15 | 0.2 |

In Table 3, CWmin is again set to 15 slots; the TXOP limit is set to 2 ms; however, each realized TXOP is 5.0 ms. Thus, each TXOP exceeds the TXOP limit by 150%, resulting in a relative excess TXOP time of 1.5 for each TXOP, according to Eq. 1. Thus, for the first through third TXOPs the accumulated excess TXOP corresponds to an increase in TXOP order of 1.0, according to Eq. 2, with every fourth TXOP having an excess TXOP order increased to 2.0. Thus, the adjusted CW value is 31 (relative to CWmin of 15), with every fourth TXOP having an adjusted CW value of 63, according to Eq. 3. Following each CW adjustment, the excess TXOP time is updated according to Eq. 4, as shown in the left-most column of Table 3.

TABLE 3

| TXOP# | CWmin (slots) | TXOP limit | realized TXOP | excess TXOP time | relative excess TXOP time | order | CW for next initial TXOP | next excess TXOP time |
|---|---|---|---|---|---|---|---|---|
| 1 | 15 | 2 | 5.0 | 3.0 | 1.5 | 1 | 31 | 1.0 |
| 2 | 15 | 2 | 5.0 | 4.0 | 2.0 | 1 | 31 | 2.0 |
| 3 | 15 | 2 | 5.0 | 5.0 | 2.5 | 1 | 31 | 3.0 |
| 4 | 15 | 2 | 5.0 | 6.0 | 3.0 | 2 | 63 | 0.0 |
| 5 | 15 | 2 | 5.0 | 3.0 | 1.5 | 1 | 31 | 1.0 |
| 6 | 15 | 2 | 5.0 | 4.0 | 2.0 | 1 | 31 | 2.0 |
| 7 | 15 | 2 | 5.0 | 5.0 | 2.5 | 1 | 31 | 3.0 |
| 8 | 15 | 2 | 5.0 | 6.0 | 3.0 | 2 | 63 | 0.0 |
| 9 | 15 | 2 | 5.0 | 3.0 | 1.5 | 1 | 31 | 1.0 |
| 10 | 15 | 2 | 5.0 | 4.0 | 2.0 | 1 | 31 | 2.0 |
| 11 | 15 | 2 | 5.0 | 5.0 | 2.5 | 1 | 31 | 3.0 |

As discussed above, CW values may be scaled according to a linear increase of the initial CW value, and a station may monitor the excess TXOP time (if any) for each TXOP. After each TXOP, the TXOP utilization is determined and a difference in TXOP time relative to the TXOP limit is aggregated to an accumulated excess TXOP time, similarly as discussed above. At each initial backoff, an adjusted CW value may be determined and the excess TXOP time may be updated based at least in part on the adjusted CW value. Initially, an adjusted CW value is determined according to the following equation:

$$\text{adjusted } CW = \text{floor}\left(CW\text{min} \times \left(1 + \frac{\text{excess } TXOP \text{ time}}{TXOP \text{ limit}}\right), 1\right). \quad (Eq.\ 5)$$

After the adjustment of the CW, the excess TXOP time may be updated according to the equation:

$$\text{excess } TXOP \text{ time} = \quad (Eq.\ 6)$$
$$\text{excess } TXOP \text{ time} - \left(\left(\frac{Adj \cdot CW}{CW\text{min}} - 1\right) \times TXOP \text{ limit}\right).$$

Tables 4-6 provide a number of numerical examples based at least in part on different values of CWmin, different TXOP limits, and different realized TXOP times. In Table 4, CWmin is set to 15 slots; the TXOP limit is set to 2 ms; and each realized TXOP is 2.5 ms. Thus, in this example, each TXOP exceeds the TXOP limit by 25%, resulting in a relative excess TXOP time of 0.25 for each TXOP, according to Eq. 1. As discussed above, the CW value for each TXOP is scaled according to Eq.5, and thus increases relative to CWmin are present for each subsequent TXOP. Following a CW adjustment, the excess TXOP time is updated according to Eq. 6.

TABLE 4

| TXOP# | CWmin (slots) | TXOP limit | realized TXOP | excess TXOP time | relative excess TXOP time | CW for next initial TXOP | next excess TXOP time |
|---|---|---|---|---|---|---|---|
| 1 | 15 | 2 | 2.5 | 0.5 | 0.25 | 18 | 0.1 |
| 2 | 15 | 2 | 2.5 | 0.6 | 0.30 | 19 | 0.1 |
| 3 | 15 | 2 | 2.5 | 0.6 | 0.28 | 19 | 0.0 |
| 4 | 15 | 2 | 2.5 | 0.5 | 0.27 | 19 | 0.0 |
| 5 | 15 | 2 | 2.5 | 0.5 | 0.25 | 18 | 0.1 |
| 6 | 15 | 2 | 2.5 | 0.6 | 0.30 | 19 | 0.1 |
| 7 | 15 | 2 | 2.5 | 0.6 | 0.28 | 19 | 0.0 |
| 8 | 15 | 2 | 2.5 | 0.5 | 0.27 | 19 | 0.0 |
| 9 | 15 | 2 | 2.5 | 0.5 | 0.25 | 18 | 0.1 |
| 10 | 15 | 2 | 2.5 | 0.6 | 0.30 | 19 | 0.1 |
| 11 | 15 | 2 | 2.5 | 0.6 | 0.28 | 19 | 0.0 |

In Table 5, CWmin is again set to 15 slots; the TXOP limit is set to 2 ms; and each realized TXOP is 2.2 ms. Thus, each TXOP exceeds the TXOP limit by 10%, resulting in a relative excess TXOP time of 0.10 for each TXOP, according to Eq. 1. As discussed above, the CW value for each TXOP is scaled according to Eq.5, and thus increases relative to CWmin are present for each subsequent TXOP. Following a CW adjustment, the excess TXOP time is updated according to Eq. 6.

TABLE 5

| TXOP# | CWmin (slots) | TXOP limit | realized TXOP | excess TXOP time | relative excess TXOP time | CW for next initial TXOP | next excess TXOP time |
|---|---|---|---|---|---|---|---|
| 1 | 15 | 2 | 2.2 | 0.2 | 0.10 | 16 | 0.1 |
| 2 | 15 | 2 | 2.2 | 0.3 | 0.13 | 17 | 0.0 |
| 3 | 15 | 2 | 2.2 | 0.2 | 0.10 | 16 | 0.1 |
| 4 | 15 | 2 | 2.2 | 0.3 | 0.13 | 17 | 0.0 |
| 5 | 15 | 2 | 2.2 | 0.2 | 0.10 | 16 | 0.1 |
| 6 | 15 | 2 | 2.2 | 0.3 | 0.13 | 17 | 0.0 |
| 7 | 15 | 2 | 2.2 | 0.2 | 0.10 | 16 | 0.1 |
| 8 | 15 | 2 | 2.2 | 0.3 | 0.13 | 17 | 0.0 |
| 9 | 15 | 2 | 2.2 | 0.2 | 0.10 | 16 | 0.1 |
| 10 | 15 | 2 | 2.2 | 0.3 | 0.13 | 17 | 0.0 |
| 11 | 15 | 2 | 2.2 | 0.2 | 0.10 | 16 | 0.1 |

In Table 6, CWmin is again set to 15 slots; and the TXOP limit is set to 2 ms; however, each realized TXOP is 5.0 ms. Thus, each TXOP exceeds the TXOP limit by 150%, resulting in a relative excess TXOP time of 1.5 for each TXOP, according to Eq. 1. As discussed above, the CW value for each TXOP is scaled according to Eq.5, and thus increases relative to CWmin are present for each subsequent TXOP. Following a CW adjustment, the excess TXOP time is updated according to Eq. 6.

TABLE 6

| TXOP# | CWmin (slots) | TXOP limit | realized TXOP | excess TXOP time | relative excess TXOP time | CW for next initial TXOP | next excess TXOP time |
|---|---|---|---|---|---|---|---|
| 1 | 15 | 2 | 5.0 | 3.0 | 1.50 | 37 | 0.1 |
| 2 | 15 | 2 | 5.0 | 3.1 | 1.50 | 38 | 0.0 |
| 3 | 15 | 2 | 5.0 | 3.0 | 1.50 | 37 | 0.1 |
| 4 | 15 | 2 | 5.0 | 3.1 | 1.50 | 38 | 0.0 |
| 5 | 15 | 2 | 5.0 | 3.0 | 1.50 | 37 | 0.1 |
| 6 | 15 | 2 | 5.0 | 3.1 | 1.50 | 38 | 0.0 |
| 7 | 15 | 2 | 5.0 | 3.0 | 1.50 | 37 | 0.1 |
| 8 | 15 | 2 | 5.0 | 3.1 | 1.50 | 38 | 0.0 |
| 9 | 15 | 2 | 5.0 | 3.0 | 1.50 | 37 | 0.1 |
| 10 | 15 | 2 | 5.0 | 3.1 | 1.50 | 38 | 0.0 |
| 11 | 15 | 2 | 5.0 | 3.0 | 1.50 | 37 | 0.1 |

Adjustments to CW values may be made to the initial CW value, but not subsequent CW values in the event that a collision occurs. According to the EDCA backoff rules, the CW may be increased to the next power of 2 minus 1 if no response is received to a transmission (e.g., there is a collision). When the initial CW value is selected according to the logarithmic (Eqs. 1-4) or linear (Eqs. 5-6) compensation techniques, subsequent CW values in the event of a collision may be selected to be the next power of 2 minus 1 based at least in part on the CWmin value, rather than the adjusted CW value. This may avoid a situation where retries also compensate for excess TXOP time, which is not needed because the initial backoff time already included compensation to adjust for excess TXOP time.

Another approach for compensating through backoff for excess TXOP time is to use a CW range that is increased based at least in part on the amount of excess TXOP time relative to the TXOP limit, namely the relative excess according to Eq. 1. A compensated CW value is determined according to the equation:

$$\text{compensated CW} = \text{required CW} \times \text{relative excess TXOP time} \quad (\text{Eq. 7}).$$

Under this approach, a station that has generated x % more TXOP time has x % fewer TXOPs. This reduction in TXOPs helps to ensure fairness with other stations and achieve an overall TXOP time for the station that is about the same as that of the other stations.

In some cases, compensation for the excess TXOP time of the station is performed after a predetermined number of TXOPs. This approach provides an opportunity for longer and shorter TXOPs to balance out. After the predetermined number of TXOPs, the net (e.g., accumulated) excess TXOP time is compensated using the compensated CW value (e.g., a larger random range, which results in a longer backoff on average). The net excess TXOP time may be the result of adding up the difference between the realized TXOP duration and the TXOP limit for several TXOPs, which means that the net excess can also be less than 0 when several TXOPs are shorter than the TXOP limit. But when the net is <0, there is no reduction of the CW to obtain more TXOPs. In other words, reduction is based on max(0, net excess). Alternatively to a predetermined number of TXOPs, the excess TXOP time of the station is capped by a maximum excess TXOP time, in which case, the excess TXOP time is compensated using the compensated CW value when the accumulated excess TXOP time of the station reaches or exceeds the maximum excess TXOP time.

In general, the success rate for the station is reduced by x % when the relative excess is x %. Thus, the compensation can be applied such that the overall average TXOP of the station stays within the TXOP limit. The use of a CW value (or CWmin/CWmax) that is x % larger than the required CW value (or CWmin/CWmax) decreases the net excess TXOP time by x % of the TXOP limit. This way the net excess can be reduced in part through the use of a larger CW value (or CWmin/CWmax), rather than all at once. A credit can even be built up in advance when the net excess TXOP time becomes negative.

To help ensure that the compensation is fair, the adjustment (e.g., increase) to the CW value is applied for each backoff between the initial backoff and the corresponding successful TXOP. For exponential backoff, this implies that for every collision, the compensation is applied to a larger CW value. For moderated backoff, this implies that the adjustment (e.g., increase) potentially also applies to different CW values until a success occurs. In such cases, however, the changes to the CW value will be smaller.

At each successful TXOP time, the excess TXOP time may be updated according to the equation:

$$\text{excess TXOP time} = \text{excess TXOP time} - (\text{realized TXOP time} - \text{TXOP limit}) \quad (\text{Eq. 8}).$$

If an excess TXOP time of x % of the TXOP limit is compensated by increasing the CW values used between initial contention and the successful TXOP by x %, the excess TXOP time may be updated according to the equation:

$$\text{excess TXOP time} = \text{excess TXOP time} - (\text{TXOP limit} \times x) \quad (\text{Eq. 9}).$$

More specifically, a new backoff is determined according to the equation:

$$\text{backoff} = \text{rand}(0, \text{used CW}) \quad (\text{Eq.10}),$$

with the used CW value given by the equation:

$$\text{used CW} = \text{round}(\text{required CW} \times x) \quad (\text{Eq. 11}).$$

Another approach is to adjust the backoff itself. One option is to increase the backoff itself by x %. Yet another option is to add an offset to the backoff, such as an offset of size (CW×x). However, a result of this option may be that the offset is unavailable for random contention when multiple stations apply compensation during the same backoffs. Statistically, this approach will have a similar compensating effect as adjusting the CW value. However, increasing the CW value by x % will retain the granularity of the backoff.

It is also possible to compensate the CWs used between the initial transmission and the successful TXOP based on a (moving) average CW, instead of using the actual CW, according to the equation:

$$\text{compensated CW} = \text{average CW} \times \text{excess TXOP time} / \text{TXOP limit} \quad (\text{Eq.12}).$$

The (moving) average can be implementation specific but bound to a certain reaction speed. For exponential backoff, it is possible that only CWmin and CWmax are increased by the compensation factor according to the following equations:

$$\text{CWmin} = \text{CWmin} * \text{excess TXOP time}/\text{TXOP limit} \quad (\text{Eq.13}).$$

$$\text{CWmax} = \text{CWmax} * \text{excess TXOP time}/\text{TXOP limit} \quad (\text{Eq.14}).$$

The compensation will then automatically ripple through to each retry at a higher CW through the CW doubling after each collision.

Various additional techniques can be employed for approaches described above. For example, in some cases a station may check whether compensation is required only after every a given number of TXOPs, or for a given time interval. The given number of TXOPs time interval may change per interval, in some examples. The compensation may be larger in such cases, but long term fairness may still be achieved and require lower processing overhead. Each time the compensation is executed, the procedure may be employed as described above. Namely, the excess TXOP time relative to the TXOP limit is multiplied by CWmin and rounded down either to the next integer or to the next power of 2 minus 1. The resulting value is used as the CW value for the next initial backoff. The resulting CW value relative to CWmin is multiplied by the TXOP limit and subtracted from the excess TXOP time to adjust the accumulated excess TXOP time to account for the adjustment in the CW value.

As discussed above, the excess TXOP time is reduced when an adjusted CW value is larger than CWmin. TXOPs that are shorter than the TXOP limit may be used to compensate excess TXOP time for one or more subsequent TXOPs.

Figure 3:
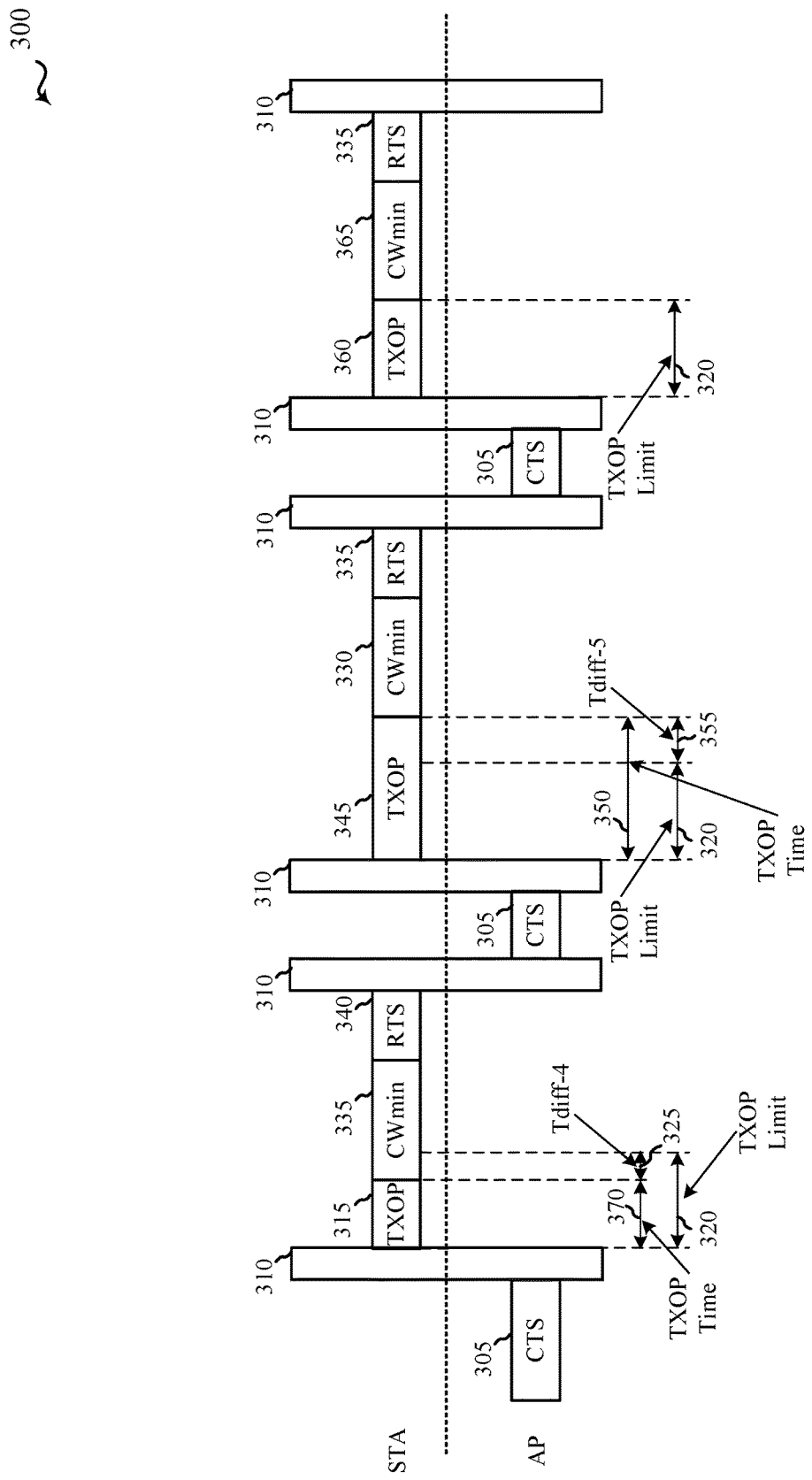
FIG. 3 shows a diagram that illustrates another example of data transmission between an AP and a station according to various examples.

FIG. 3 illustrates an example 300 of transmissions between a station and an AP, such as between a station 115 and AP 105 of FIG. 1, according to examples that may employ such dual-compensation techniques. Station and AP may implement RTS/CTS techniques, and may adjust a CW value based at least in part on utilization of one or more TXOPs. Alternatively, a station may initiate a TXOP directly, and in the absence of an ACK from the AP following a first frame may determine that a collision has occurred. In FIG. 3, the AP sends a CTS 305 to station. After a SIFS 310, the station may initiate TXOP 315 to transmit data. TXOP time 370 may be less than TXOP limit 320, thus resulting in a Tdiff-4 325 that indicates the TXOP utilization was less than an allowed TXOP utilization. The station waits a backoff time based at least in part on CWmin 330, sends RTS 335, and repeats the process.

As mentioned above, TXOPs that exceed the TXOP limit may be exchanged for a longer average backoff, which may be accomplished through increasing a CW value. In a dual compensation example such as in FIG. 3, TXOPs that utilize less than the TXOP limit may be used to compensate subsequent TXOPs that exceed the TXOP limit. In FIG. 3, TXOP 345 may have a TXOP time that exceeds TXOP limit 320, resulting in Tdiff-5 355. Tdiff-5 355 may be aggregated with Tdiff-4 325, and the result may be that a subsequent CW value may not require adjustment, and a backoff based at least in part on CWmin 330 may follow TXOP 345 even though the TXOP time 350 of TXOP 345 exceeded TXOP limit 320. TXOP 360 may fully utilize TXOP limit 320 resulting in no difference value, and CWmin 365 may follow TXOP 360. Similarly as discussed above, the compensation provided may be such that the average amount of airtime between devices that do exceed the TXOP limit 320 and those that do not exceed the TXOP limit 320 is about the same, on average. To this end, in examples, the station may keep track of the excess TXOP times through accumulation of multiple Tdiff values from multiple TXOPs. A CW may also be adjusted when an accumulated excess TXOP time exceeds a certain value.

Excess TXOP time for dual compensation may be maintained by determining a Tdiff for each TXOP, according to the following equation:

$$Tdiff=TXOP\ time-TXOP\ limit \quad (Eq.\ 7).$$

The value of Tdiff may be aggregated with existing accumulated excess TXOP time. The excess TXOP time may be initialized at 0, and a max operation may be used to provide that the excess TXOP time is never smaller than 0, such as according to the following equation:

$$Texcess=max\ (Texcess+Tdif,\ 0) \quad (Eq.\ 8).$$

Table 7 provides a numerical example in which the TXOP limit is set to 2 ms, and each realized TXOP time is indicated in the right column.

TABLE 7

| TXOP time | Dif from TXOP limit | excess TXOP time |
|---|---|---|
| 1.5 | −0.5 | 0 |
| 1.2 | −0.8 | 0 |
| 2.8 | 0.8 | 0.8 |
| 2.9 | 0.9 | 1.7 |
| 3.1 | 1.1 | 2.8 |

TABLE 7-continued

| TXOP time | Dif from TXOP limit | excess TXOP time |
|---|---|---|
| 1.2 | −0.8 | 2 |
| 1.2 | −0.8 | 1.2 |
| 1.5 | −0.5 | 0.7 |
| 0.8 | −1.2 | 0 |
| 1.8 | −0.2 | 0 |

In addition to compensation through the TXOP time, the excess TXOP time may also be compensated by setting a higher CW for an initial TXOP. The relative excess may be determined according to the following equation:

$$relativeExcess=Texcess/TXOP\ limit \quad (Eq.\ 9).$$

Therefore, the extra CW may be determined according to:

$$extraCW=CWmin\times relativeExcess \quad (Eq.\ 10).$$

The initial CW value may then be adjusted according to:

$$Adjusted\ CW=CWmin|extraCW \quad (Eq.\ 11).$$

The adjusted CW value may be rounded to an integer value corresponding to a number of slots for the CW value. Next, a deduction to the excess TXOP time due to the extra CW may be determined according to:

$$TExcessDeduction=TXOP\ limit*extraCW/CWmin \quad (Eq.\ 12).$$

In deployments that require a CW value to be a power of 2 minus 1, the log 2 may be taken from the adjusted CW, rounded down to the next lower integer, and applied as a power of 2 minus 1, according to:

$$log(adjusted\ CW)=log\ 2(adjusted\ CW+1) \quad (Eq.\ 13).$$

The value from Eq. 13 may be rounded down to the nearest integer. Thus, a second adjusted CW (CWadj2) for such cases, as power of 2 minus 1 may be determined according to:

$$CWadj2=2^{log(Adjusted\ CW)}-1 \quad (Eq.\ 14).$$

The deduction to the excess TXOP time due to the adjusted CW value may be determined according to:

$$TExcessDeduction = TXOP\ limit \times \frac{Cwadj2 - CWmin}{CWmin}. \quad (Eq.\ 15)$$

The differences between the adjusted CW and CWadj2 for examples that do linear versus exponential compensation are illustrated in Table 8 below.

TABLE 8

| Adj. CW | Log2(Adj. CW + 1) | rounded down | CWadj2 |
|---|---|---|---|
| 1 | 1.00 | 1 | 1 |
| 2 | 1.58 | 1 | 1 |
| 3 | 2.00 | 2 | 3 |
| 4 | 2.32 | 2 | 3 |
| 5 | 2.58 | 2 | 3 |
| 6 | 2.81 | 2 | 3 |
| 7 | 3.00 | 3 | 7 |
| 8 | 3.17 | 3 | 7 |
| 9 | 3.32 | 3 | 7 |
| 10 | 3.46 | 3 | 7 |
| 11 | 3.58 | 3 | 7 |
| 12 | 3.70 | 3 | 7 |
| 13 | 3.81 | 3 | 7 |
| 14 | 3.91 | 3 | 7 |

TABLE 8-continued

| Adj. CW | Log2(Adj. CW + 1) | rounded down | CWadj2 |
|---|---|---|---|
| 15 | 4.00 | 4 | 15 |
| 16 | 4.09 | 4 | 15 |
| 17 | 4.17 | 4 | 15 |
| 18 | 4.25 | 4 | 15 |
| 19 | 4.32 | 4 | 15 |
| 20 | 4.39 | 4 | 15 |
| 21 | 4.46 | 4 | 15 |
| 22 | 4.52 | 4 | 15 |
| 23 | 4.58 | 4 | 15 |
| 24 | 4.64 | 4 | 15 |
| 25 | 4.70 | 4 | 15 |
| 26 | 4.75 | 4 | 15 |
| 27 | 4.81 | 4 | 15 |
| 28 | 4.86 | 4 | 15 |
| 29 | 4.91 | 4 | 15 |
| 30 | 4.95 | 4 | 15 |
| 31 | 5.00 | 5 | 31 |
| 32 | 5.04 | 5 | 31 |
| 33 | 5.09 | 5 | 31 |
| 34 | 5.13 | 5 | 31 |
| 35 | 5.17 | 5 | 31 |
| 36 | 5.21 | 5 | 31 |
| 37 | 5.25 | 5 | 31 |
| 38 | 5.29 | 5 | 31 |
| 39 | 5.32 | 5 | 31 |
| 40 | 5.36 | 5 | 31 |
| 41 | 5.39 | 5 | 31 |
| 42 | 5.43 | 5 | 31 |
| 43 | 5.46 | 5 | 31 |
| 44 | 5.49 | 5 | 31 |
| 45 | 5.52 | 5 | 31 |
| 46 | 5.55 | 5 | 31 |
| 47 | 5.58 | 5 | 31 |
| 48 | 5.61 | 5 | 31 |
| 49 | 5.64 | 5 | 31 |
| 50 | 5.67 | 5 | 31 |
| 51 | 5.70 | 5 | 31 |
| 52 | 5.73 | 5 | 31 |
| 53 | 5.75 | 5 | 31 |
| 54 | 5.78 | 5 | 31 |
| 55 | 5.81 | 5 | 31 |
| 56 | 5.83 | 5 | 31 |
| 57 | 5.86 | 5 | 31 |
| 58 | 5.88 | 5 | 31 |
| 59 | 5.91 | 5 | 31 |
| 60 | 5.93 | 5 | 31 |
| 61 | 5.95 | 5 | 31 |
| 62 | 5.98 | 5 | 31 |
| 63 | 6.00 | 6 | 63 |
| 64 | 6.02 | 6 | 63 |
| 65 | 6.04 | 6 | 63 |
| 66 | 6.07 | 6 | 63 |
| 67 | 6.09 | 6 | 63 |
| 68 | 6.11 | 6 | 63 |
| 69 | 6.13 | 6 | 63 |
| 70 | 6.15 | 6 | 63 |

It is also possible to determine the Texcess values at which the adjusted CW jumps to the next power of 2 minus 1, as illustrated in Table 9.

TABLE 9

| CWmin | TXOPlimit | CWadj2 | TExcessDeduction |
|---|---|---|---|
| 15 | 2 | 15 | 0 |
| 15 | 2 | 31 | 2.1 |
| 15 | 2 | 63 | 6.4 |
| 15 | 2 | 127 | 14.9 |
| 15 | 2 | 255 | 32.0 |
| 15 | 2 | 511 | 66.1 |
| 15 | 2 | 1023 | 134.4 |
| 15 | 2 | 2047 | 270.9 |

As can be observed from Eqs. 9-15 and from Table 9, once Texcess is in the range between 2.1 and 6.4 ms, a compensation occurs by a CW equal to 31. Similarly, a Texcess between 6.4 and 14.9 is compensated by a CW equal to 63, and so on.

Techniques are provided that allow for obtaining excess TXOP time in advance by setting an initial CW value to be larger than CWmin prior to initiating a TXOP that exceeds the TXOP limit. The amount of excess TXOP time obtained by setting a larger initial CW value may be determined, for example, according to:

$$Texcess=Texcess+TXOP\ limit\times(initial\ CW-Cwmin)/CWmin \quad (Eq.\ 16).$$

For example, an initial CW may be set to 31 for an initial backoff when CWmin is 15. Such an adjustment in the initial CW may gain 2.1 ms of excess TXOP time, which is the same value as shown in the second row of Table 9 for TExcessDeduction. Such excess TXOP time may be deducted from Texcess, after which Texcess may be filled again by one or more initial CWs that are larger than CWmin. Texcess may also be filled by TXOPs that are shorter than the TXOP limit. The accumulated time less than the TXOP limit may be added to Texcess, in a similar manner as described above.

Figure 4:
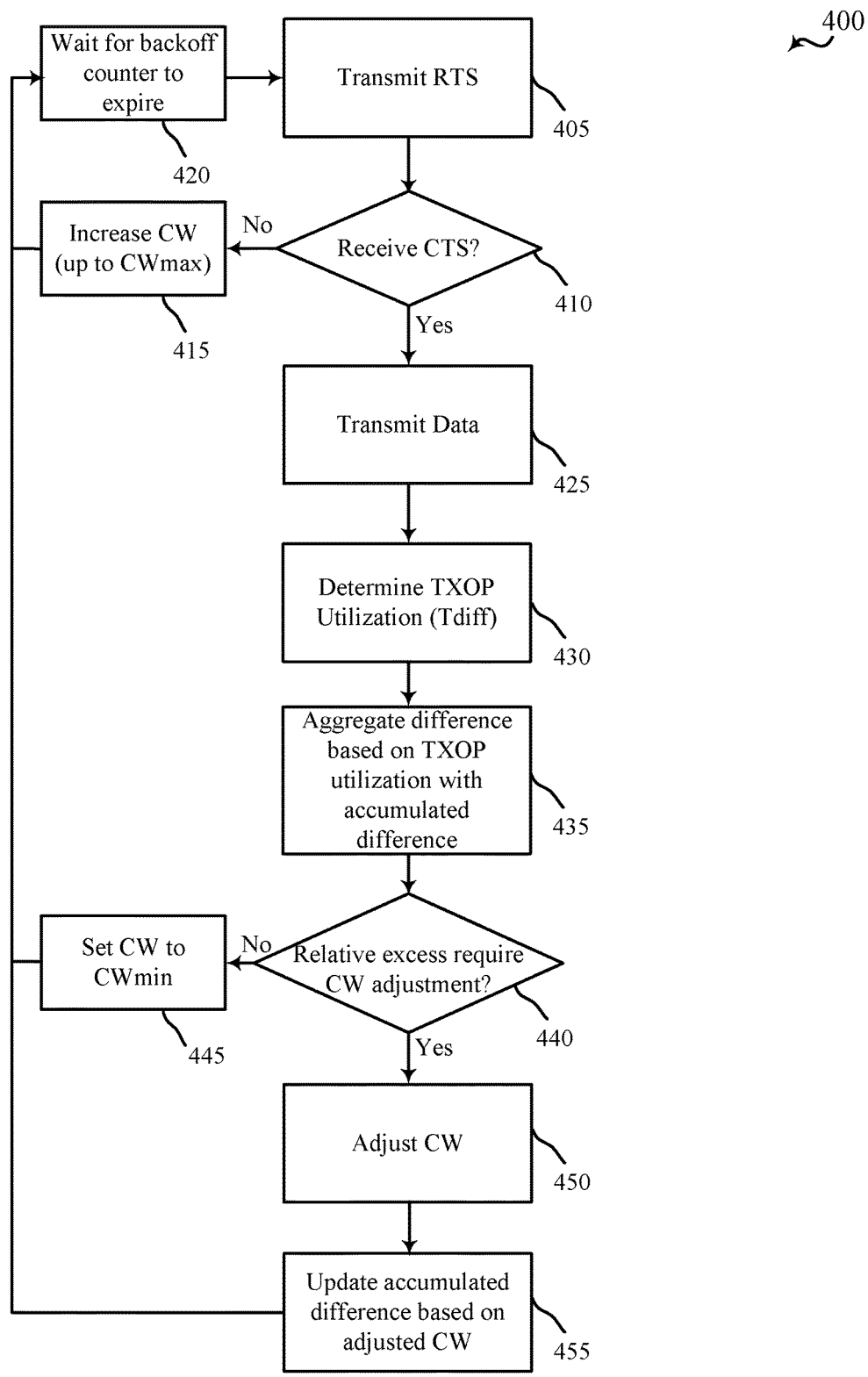
FIG. 4 is a flowchart of an example of operations related to adjusting a contention window for wireless channel access according to various examples.

With reference now to FIG. 4, a flow diagram of a method 400 for adjusting a CW size at a station is discussed in accordance with various examples. The method 400 may be implemented using, for example, the stations 115 of FIG. 1, station 115 of FIG. 7 or devices of FIGS. 5A through 5C, discussed below. At block 405, the station transmits RTS frame. At block 410, the station determines if CTS is received. If CTS is not received, the station increases the CW according to usual collision avoidance techniques, up to a limit of CWmax, as indicated at block 415. The station waits for a backoff counter that is set based at least in part on the CW to expire, as indicated at block 420, and operations are continued at block 405. If the station does receive a CTS, it transmits data to the AP, as indicated at block 425. At block 430, the station determines a utilization of the TXOP. TXOP utilization may be determined based at least in part on a TXOP limit duration as compared to a duration of data transmitted at block 425 (e.g., Tdiff). TXOP utilization may also be determined based at least in part on an amount of data transmitted during the TXOP as compared to a theoretical maximum amount of data that could be transmitted during the TXOP.

At block 435, the difference in TXOP times may be aggregated with an accumulated difference. At block 440, it is determined if the relative excess of the accumulated difference requires a CW adjustment. Such a determination may be made according to one or more of the techniques described above. If no CW value adjustment is required, the CW value is set to CWmin, as indicated at block 445, and the operations of block 420 are repeated. If a CW value adjustment is determined to be necessary, the CW value may be adjusted as indicated at block 450. Such a CW adjustment may be a linear CW adjustment, or an exponential CW adjustment, and may be determined according to the techniques described above, for example. At block 455, the accumulated difference in TXOP times may be updated based at least in part on the adjusted CW. Such an update to the accumulated difference may be determined according to the techniques described above, for example. Following the update of the accumulated difference, the operations of block 420 are repeated, with the backoff counter set according to the adjusted CW from block 450.

Figure 5A:
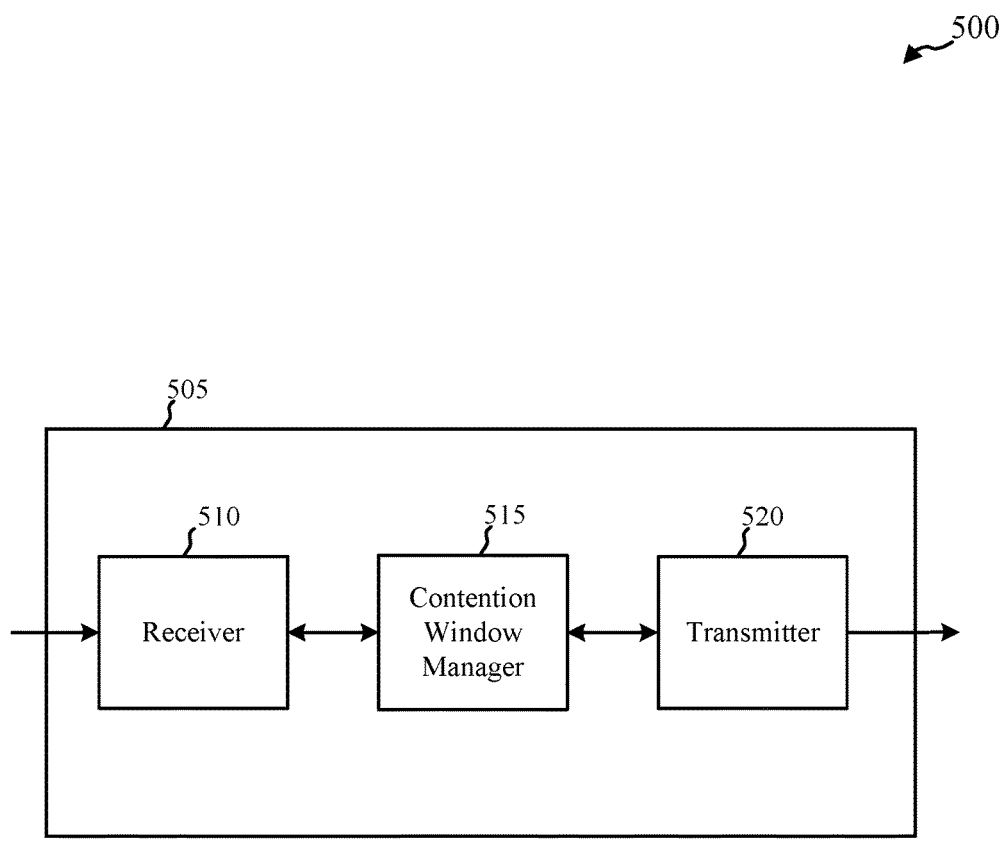
FIGS. 5A-5C show a block diagrams that illustrate examples of an architecture for adjusting contention windows according to various examples.

With reference now to FIG. 5A, a block diagram 500 illustrates a device 505 that may be used for CW adjustment of various examples. The device 505 may be an example of one or more aspects of the APs 105 or stations 115 described with reference to FIG. 1, or FIGS. 6-7 as will be described below. The device 505, or portions of it, may also be a processor. The device 505 may include a receiver 510, a contention window manager 515, and a transmitter 520. Each of these components may be in communication with each other. The device 505, through the receiver 510, the contention window manager 515, or the transmitter 520, may be configured to transmit TXOPs according to timing determined based at least in part on initial or adjusted CWs in order to transmit TXOPs having durations that may exceed a TXOP limit, similarly as discussed above with respect to FIGS. 1-4.

Figure 5B:
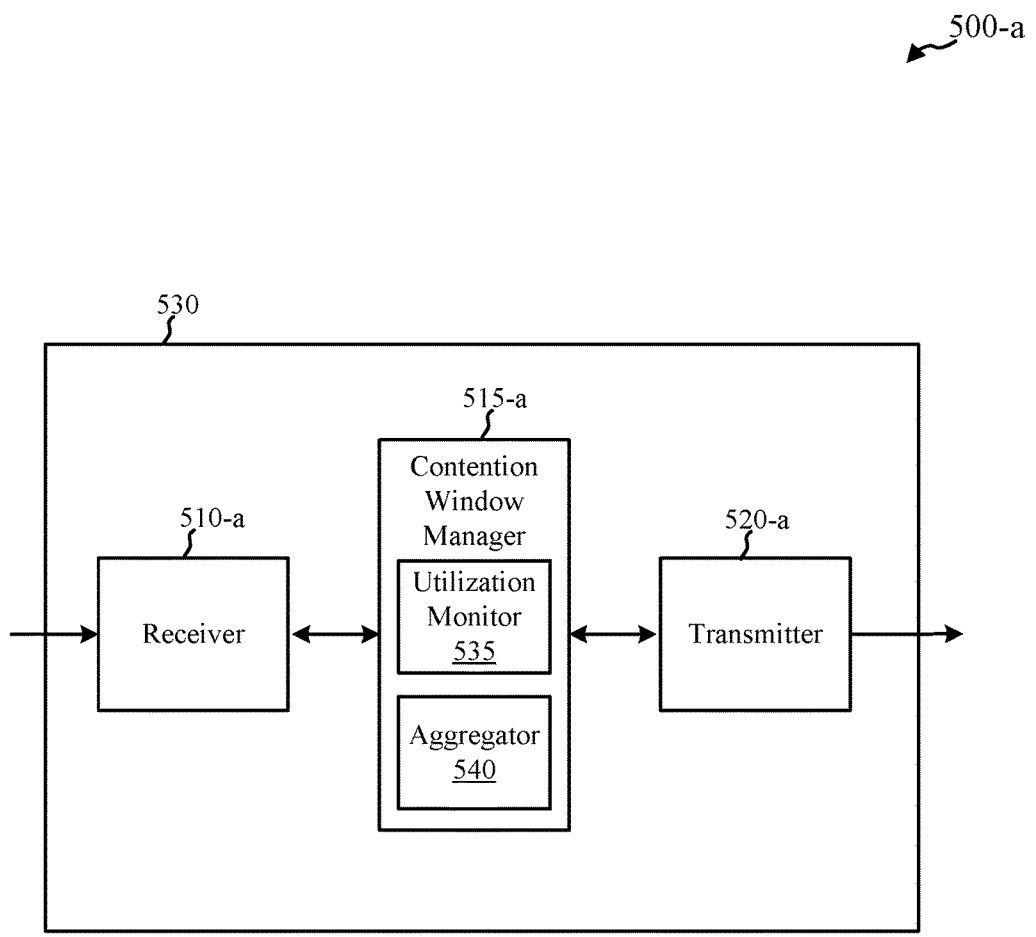

With reference now to FIG. 5B, a block diagram 500-a illustrates a device 530 that may be used for CW adjustment of various examples. The device 530 may be an example of one or more aspects of the APs 105 or stations 115 described with reference to FIG. 1, or FIGS. 6-7 as will be described below. The device 530, or portions of it, may also be a processor. The device 530 may include a receiver 510-a, a contention window manager 515-a, or a transmitter 520-a, similarly as described with respect to FIG. 5A. Each of these components may be in communication with each other. The contention window manager 515-a, in this example, includes a utilization monitor 535 that may monitor the utilization of TXOPs and determine differences between one or more utilized TXOPs and a TXOP limit. Differences may be determined by utilization monitor 535 according to the techniques described above, for example. Such differences may be provided to aggregator 540, which may aggregate differences with an accumulated difference, according to techniques described above with respect to FIGS. 1-4.

Figure 5C:
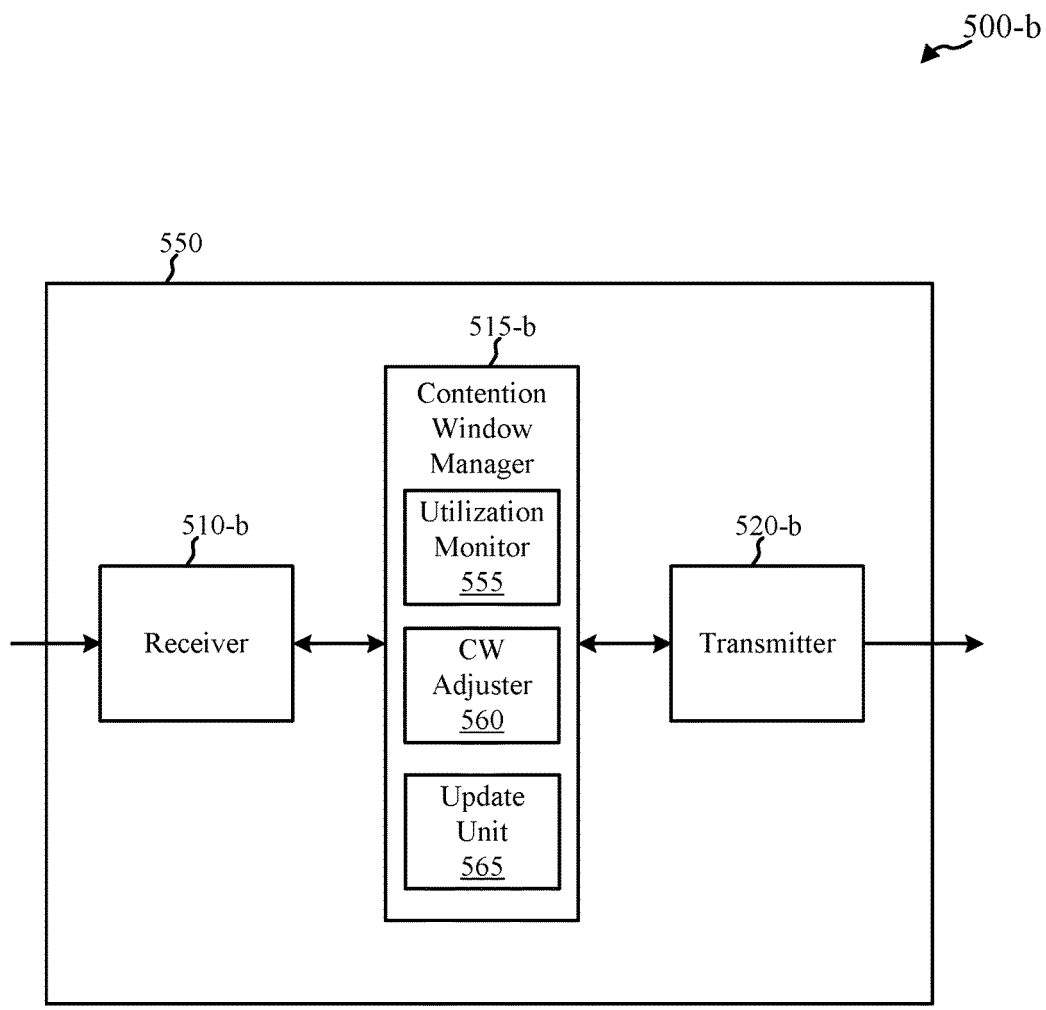

With reference now to FIG. 5C, a block diagram 500-b illustrates a device 550 that may be used for CW adjustment of various examples. The device 550 may be an example of one or more aspects of the APs 105 or stations 115 described with reference to FIG. 1, or FIGS. 6-7 as will be described below. The device 550, or portions of it, may also be a processor. The device 550 may include a receiver 510-b, a contention window manager 515-b, or a transmitter 520-b, similarly as described with respect to FIGS. 5A and 5B. Each of these components may be in communication with each other. The contention window manager 515-b, in this example, includes a utilization monitor 555 that may monitor the utilization of TXOPs and determine differences between one or more utilized TXOPs and a TXOP limit. Differences may be determined by utilization monitor 555 according to the techniques described above, for example. A CW adjuster 560 may adjust one or more CW values based at least in part on TXOP utilization determined by utilization monitor 555, according to techniques, for example, described above with respect to FIGS. 1-4. Update unit 565 may update accumulated TXOP differences based at least in part on the adjusted CW value, according to techniques, for example, described above with respect to FIGS. 1-4.

Figure 6:
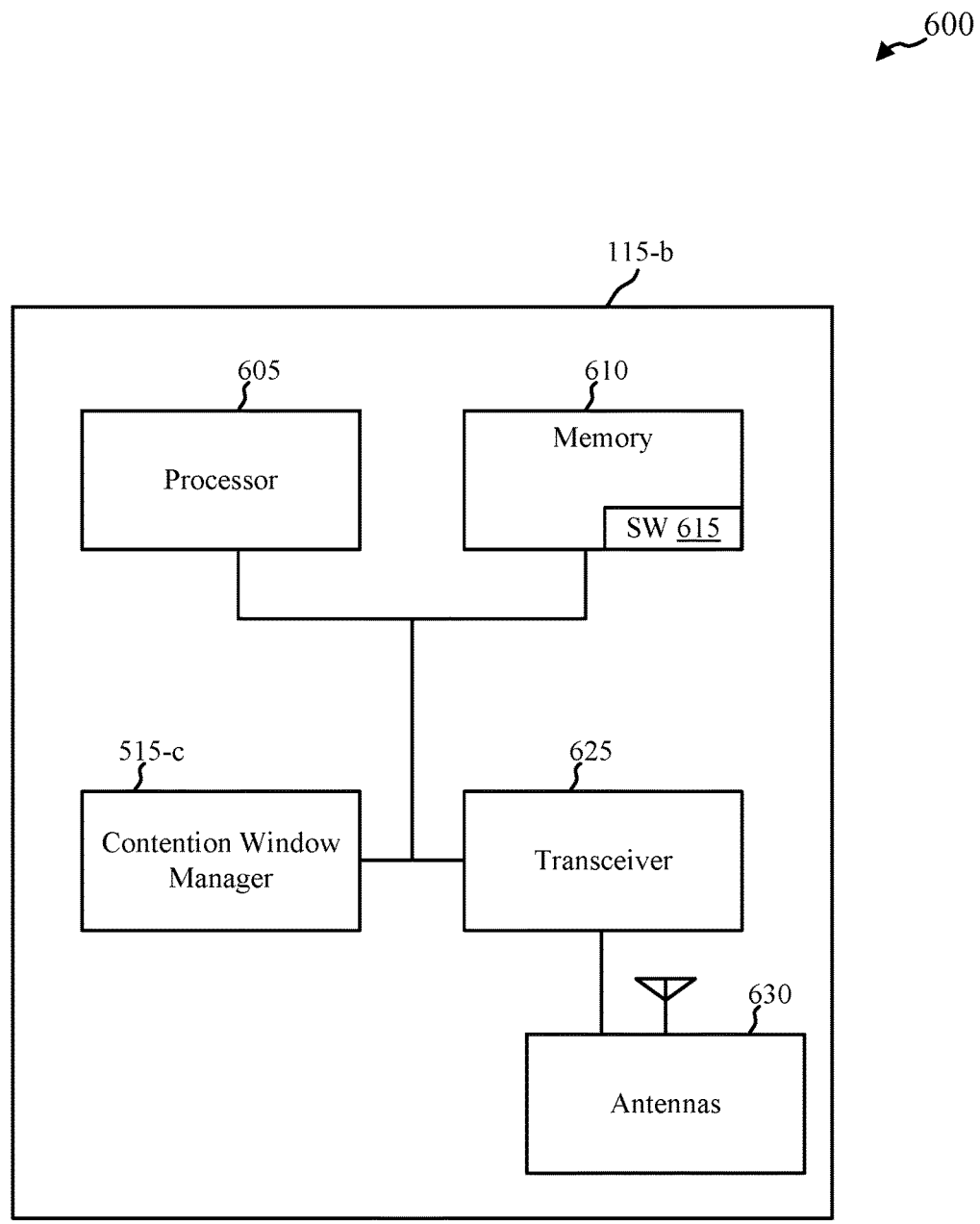
FIG. 6 shows a block diagram that illustrates an example of a station architecture according to various examples.

Turning to FIG. 6, a diagram 600 is shown that illustrates a station 115-b configured for CW adjustment based at least in part on TXOP utilization according to various examples. The station 115-b may have various other configurations and may be included or be part of a personal computer (e.g., laptop computer, netbook computer, tablet computer, etc.), a cellular telephone, a PDA, a digital video recorder (DVR), an internet appliance, a gaming console, an e-reader, etc. The station 115-b may have an internal power supply (not shown), such as a small battery, to facilitate mobile operation. The station 115-b may be an example of the stations 115 and may implement various operations described with respect to FIGS. 1-4.

The station 115-b may include a processor 605, a memory 610, a transceiver 625, antennas 630, and a contention window manager 515-c. The contention window manager 515-c may be an example of the contention window manager 515 of FIG. 5A, 5B, or 5C. Each of these components may be in communication with each other, directly or indirectly, over one or more buses for example.

The memory 610 may include RAM and ROM. The memory 610 may store computer-readable, computer-executable software (SW) code 615 containing instructions that are configured to, when executed, cause the processor 605 to perform various functions described herein for contention window adjustment. Alternatively, the software code 615 may not be directly executable by the processor 605 but be configured to cause the computer (e.g., when compiled and executed) to perform functions described herein.

The processor 605 may include an intelligent hardware device, e.g., a CPU, a microcontroller, an ASIC, etc. The processor 605 may process information received through the transceiver 625 or to be sent to the transceiver 625 for transmission through the antennas 630. The processor 605 may handle, alone or in connection with the contention window manager 620, various aspects for TXOP utilization and CW adjustment based at least in part on TXOP utilization and accumulated differences in TXOP utilization, as described herein.

Figure 8:
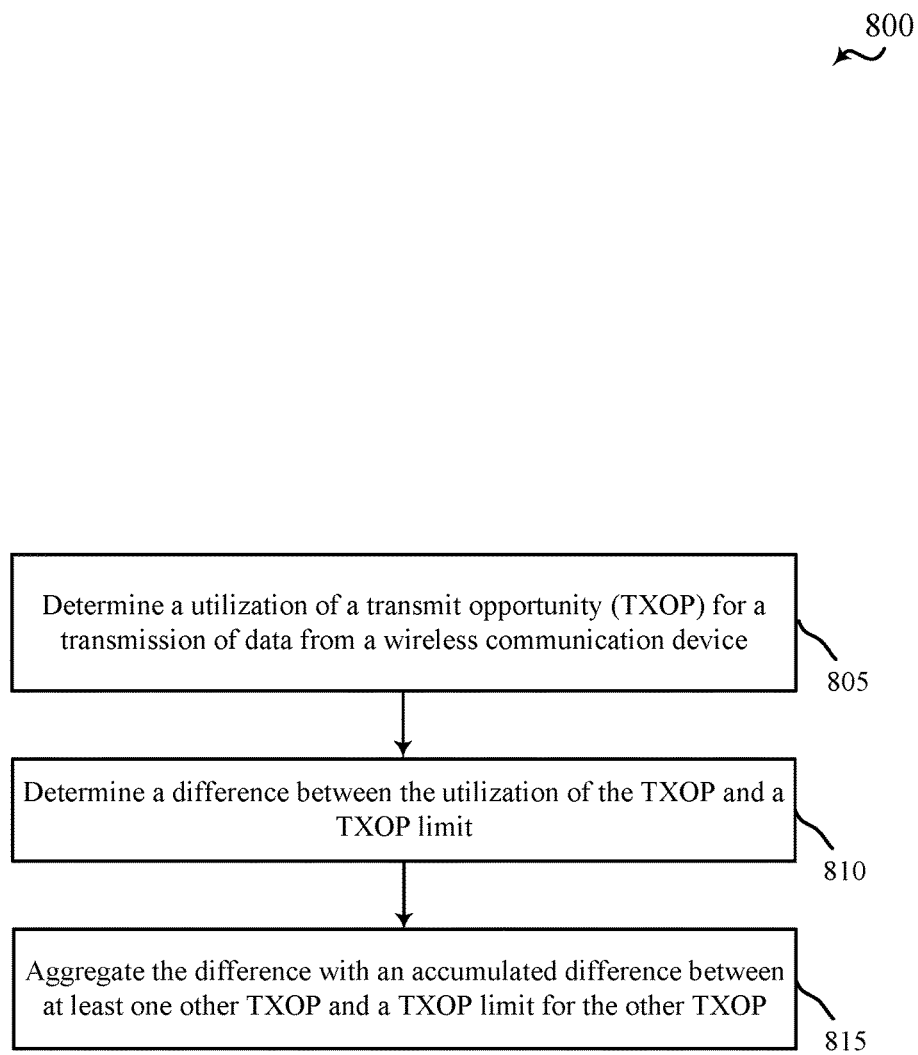
FIG. 8 is a flowchart of an example of a method for contention window adjustment in a wireless communication system according to various examples.

The transceiver 625 may be configured to communicate bi-directionally with APs 105 in FIG. 1 or 8. The transceiver 625 may be implemented as one or more transmitters and one or more separate receivers. The transceiver 625 may include a modem configured to modulate the packets and provide the modulated packets to the antennas 630 for transmission, and to demodulate packets received from the antennas 630. While the station 115-b may include a single antenna, there may be examples in which the station 115-b may include multiple antennas 630.

The components of the station 115-b may be configured to implement aspects discussed above with respect to FIGS. 1-5, and those aspects may not be repeated here for the sake of brevity. Moreover, the components of the station 115-b may be configured to implement aspects discussed below with respect to FIGS. 8-11, and those aspects may not be repeated here also for the sake of brevity.

Figure 7:
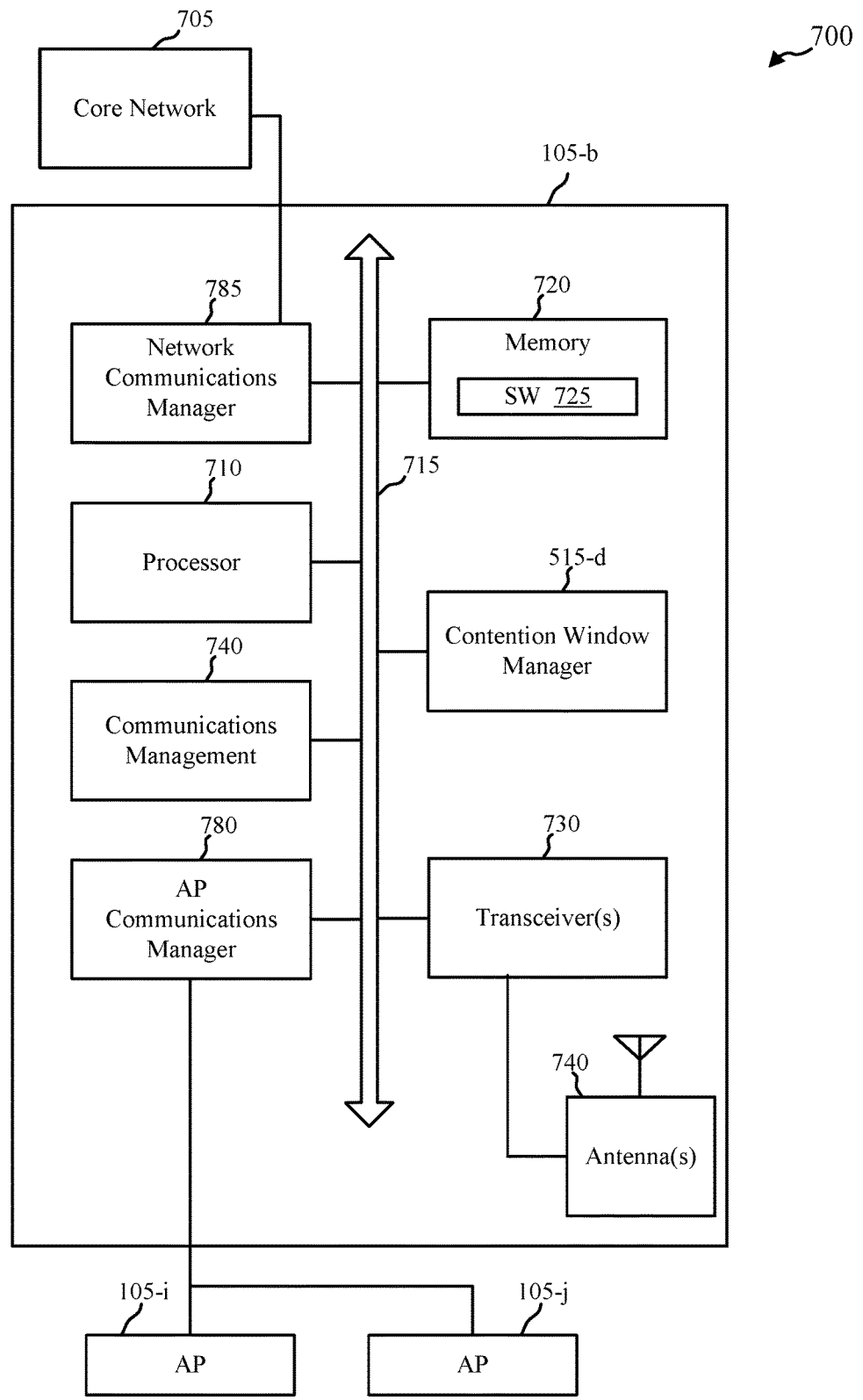
FIG. 7 shows a block diagram that illustrates an example of an AP architecture according to various examples.

Turning to FIG. 7, a diagram 700 is shown that illustrates an access point or AP 105-b configured for CW management according to various examples. The AP 105-b may be an example of the APs 105 of FIG. 1. The AP 105-b may include a processor 710, a memory 720, a transceiver 730, antennas 740, and a contention window manager 515-d. The contention window manager 515-d may be an example of the contention window manager 515 of FIG. 5A, 5B, or 5C. The AP 105-b may also include one or both of an AP communications manager 780 and a network communications manager 785. Each of these components may be in communication with each other, directly or indirectly, over one or more buses 715.

The memory 720 may include random access memory (RAM) and read-only memory (ROM). The memory 720 may also store computer-readable, computer-executable software (SW) code 725 containing instructions that are configured to, when executed, cause the processor 710 to perform various functions described herein for CW management and adjustment by a station (e.g., which may be provided to a station, etc.). Alternatively, the software code 725 may not be directly executable by the processor 710 but be configured to cause the computer, e.g., when compiled and executed, to perform functions described herein.

The processor 710 may include an intelligent hardware device, e.g., a central processing unit (CPU), a microcontroller, an application-specific integrated circuit (ASIC), etc. The processor 710 may process information received through the transceiver(s) 730, the APs communications manager 780, or the network communications manager 785. The processor 710 may also process information to be sent to the transceiver(s) 730 for transmission through the antenna(s) 740, to the AP communications manager 780, or to the network communications manager 785. The processor 710 may handle, alone or in connection with other components, various aspects related to CW management and adjustment as discussed above.

The transceiver(s) 730 may include a modem configured to modulate the packets and provide the modulated packets to the antennas 740 for transmission, and to demodulate packets received from the antennas 740. The transceiver(s) 730 may be implemented as one or more transmitter(s) and one or more separate receiver(s). The transceiver(s) 730 may be configured to communicate bi-directionally, via the antenna(s) 740, with one or more stations 115 as illustrated in FIG. 1, for example. The AP 105-b may typically include multiple antennas 740 (e.g., an antenna array). The AP 105-b may communicate with a core network 705 through the network communications manager 785. The AP 105-b may communicate with other APs, such as the access point 105-i and the access point 105-j, using an AP communications manager 780. The components of the AP 105-b may be configured to implement aspects discussed above with respect to FIGS. 1-5, and those aspects may not be repeated here for the sake of brevity. Moreover, the components of the AP 105-b may be configured to implement aspects discussed below with respect to FIGS. 8-11 and those aspects may not be repeated here also for the sake of brevity.

Turning next to FIG. 8, a flow diagram is described for a method 800 for TXOP utilization determination and aggregation in accordance with various examples. The method 800 may be implemented using, for example, the stations 115 of FIG. 1 or 6; APs 105 of FIG. 1 or 7, or devices 505, 530, or 550 of FIG. 5A, 5B, or 5C, for example. At block 805, a utilization of a transmit opportunity (TXOP) is determined for a transmission of data from a wireless communication device. At block 810, a difference between the utilization of the TXOP and a TXOP limit is determined. At block 815, the difference is aggregated with an accumulated difference between at least one other TXOP and a TXOP limit for the other TXOP(s).

Figure 9:
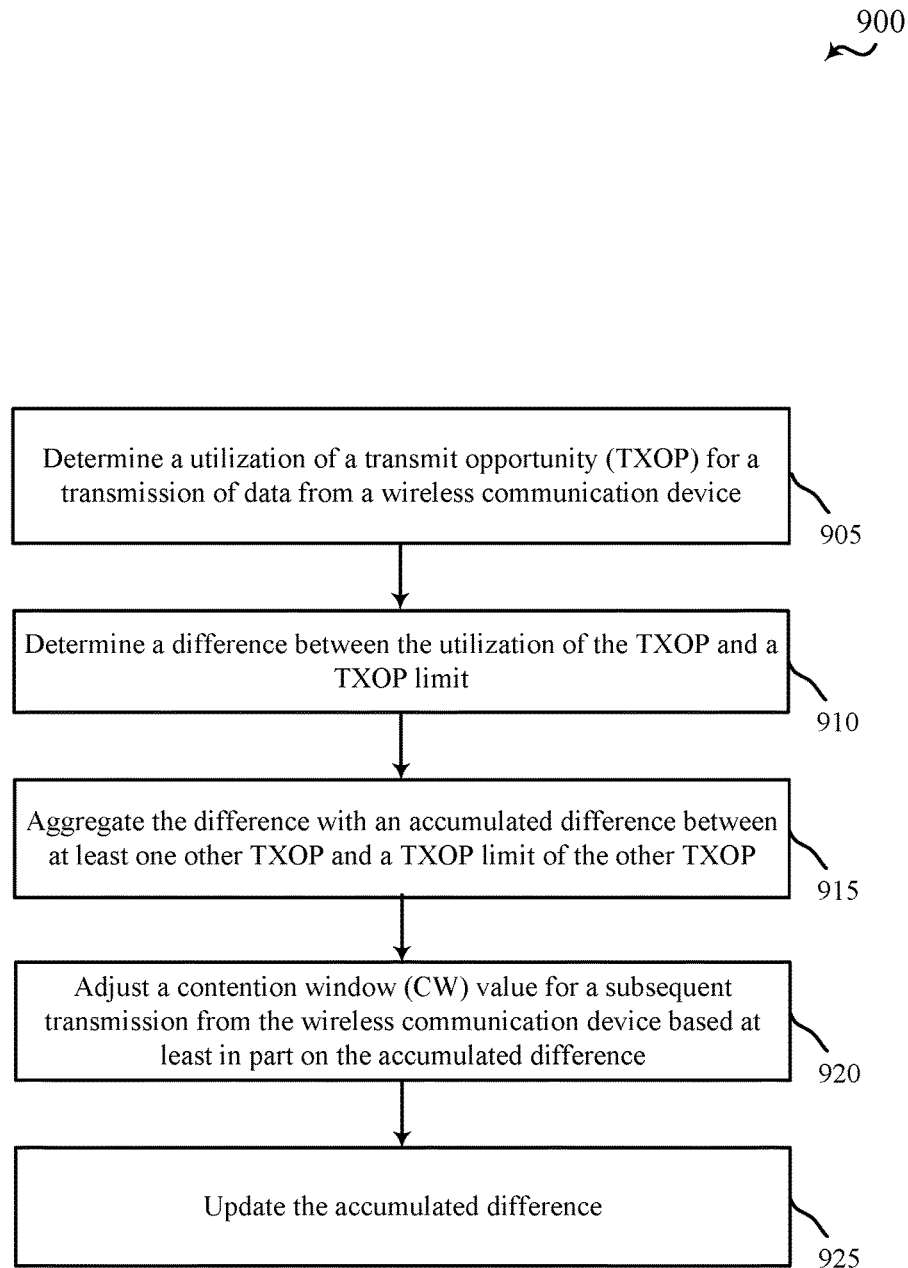
FIG. 9 is a flowchart of an example of another method for contention window adjustment in a wireless communication system according to various examples.

Turning next to FIG. 9, another flow diagram is described for a method 900 for TXOP utilization determination and aggregation in accordance with various examples. The method 900 may be implemented using, for example, the stations 115 of FIG. 1 or 6; APs 105 of FIG. 1 or 7, or devices 505, 530, or 550 of FIG. 5A, 5B, or 5C, for example. At block 905, a utilization of a transmit opportunity (TXOP) is determined for a transmission of data from a wireless communication device. At block 910, a difference between the utilization of the TXOP and a TXOP limit is determined. At block 915, the difference is aggregated with an accumulated difference between at least one other TXOP and a TXOP limit for the other TXOP(s). At block 920, a CW value is adjusted for a subsequent transmission from the wireless communication device based at least in part on the accumulated difference. At block 925, the accumulated difference is updated based at least in part on the adjusted CW value, for example, as described above.

Figure 10:
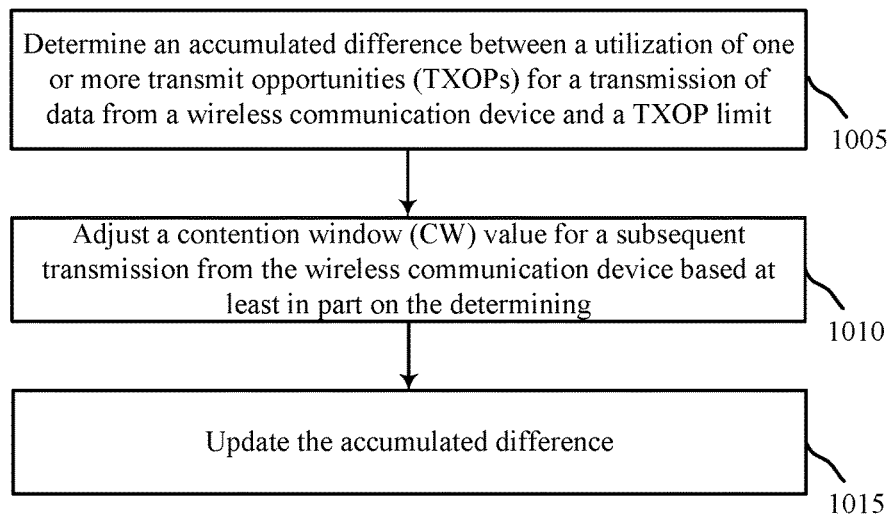
FIG. 10 is a flowchart of an example of yet another method for contention window adjustment in a wireless communication system according to various examples.

Turning next to FIG. 10, a flow diagram is described for a method 1000 for CW adjustment based at least in part on TXOP utilization in accordance with various examples. The method 1000 may be implemented using, for example, the stations 115 of FIG. 1 or 6; APs 105 of FIG. 1 or 7, or devices 505, 530, or 550 of FIG. 5A, 5B, or 5C, for example. At block 1005, an accumulated difference between a utilization of one or more transmit opportunities (TXOPs) for a transmission of data from a wireless communication device and a TXOP limit is determined. At block 1010, a CW value is adjusted for a subsequent transmission from the wireless communication device based at least in part on the determination. At block 1015, the accumulated difference is updated based at least in part on a realized TXOP time obtained using the adjusted CW value, for example, as described above.

Figure 11:
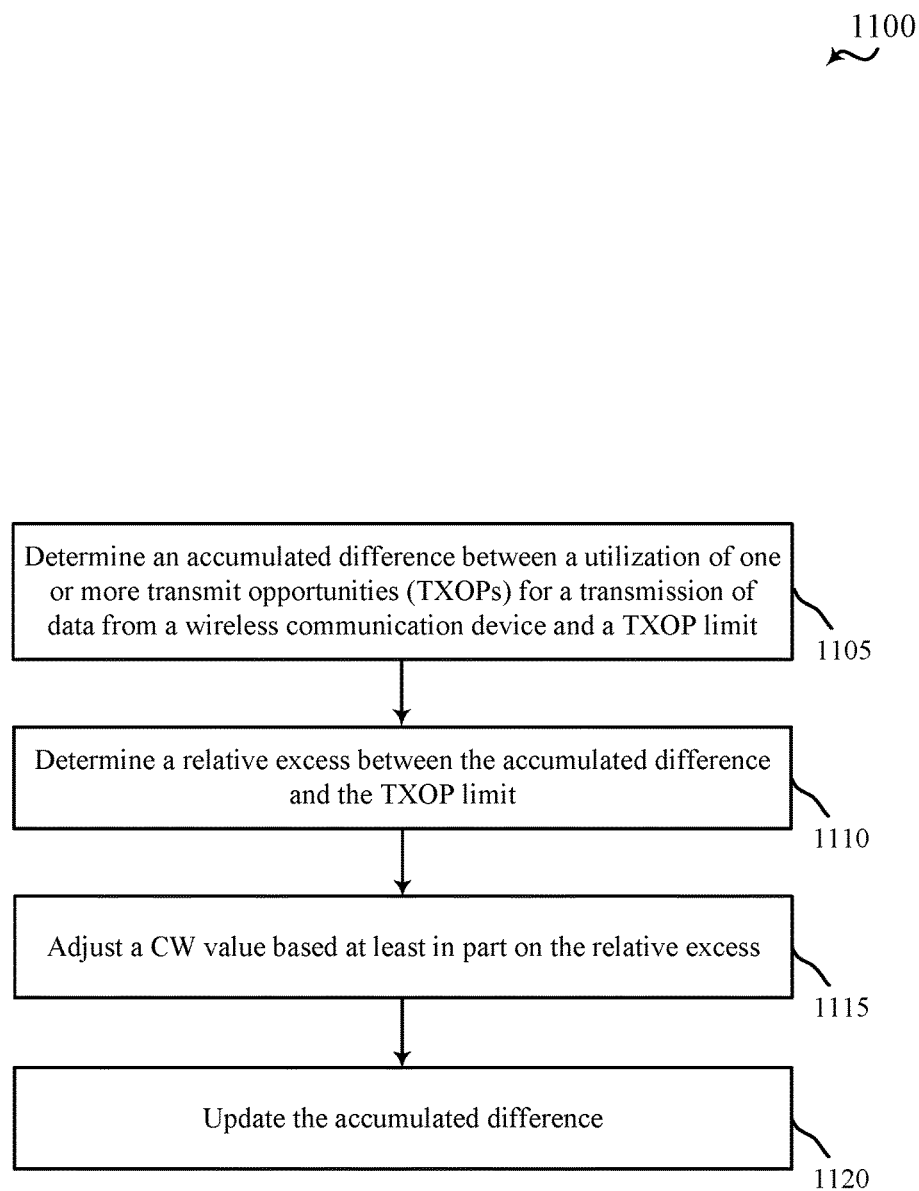
FIG. 11 is a flowchart of an example of a method for dynamic control of contention windows in a wireless communication system according to various examples.

Turning next to FIG. 11, another flow diagram is described for a method 1100 for CW adjustment based at least in part on TXOP utilization in accordance with various examples. The method 1100 may be implemented using, for example, the stations 115 of FIG. 1 or 6; APs 105 of FIG. 1 or 7, or devices 505, 530, or 550 of FIG. 5A, 5B, or 5C, for example. At block 1105, an accumulated difference between a utilization of one or more transmit opportunities (TXOPs) for a transmission of data from a wireless communication device and a TXOP limit is determined. At block 1110, a relative excess between the accumulated difference and the TXOP limit is determined. At block 1115, a CW value is adjusted based at least in part on the relative excess. At block 1120, the accumulated difference is updated based at least in part on the adjustment to the CW value, for example, as described above.

Figure 12:
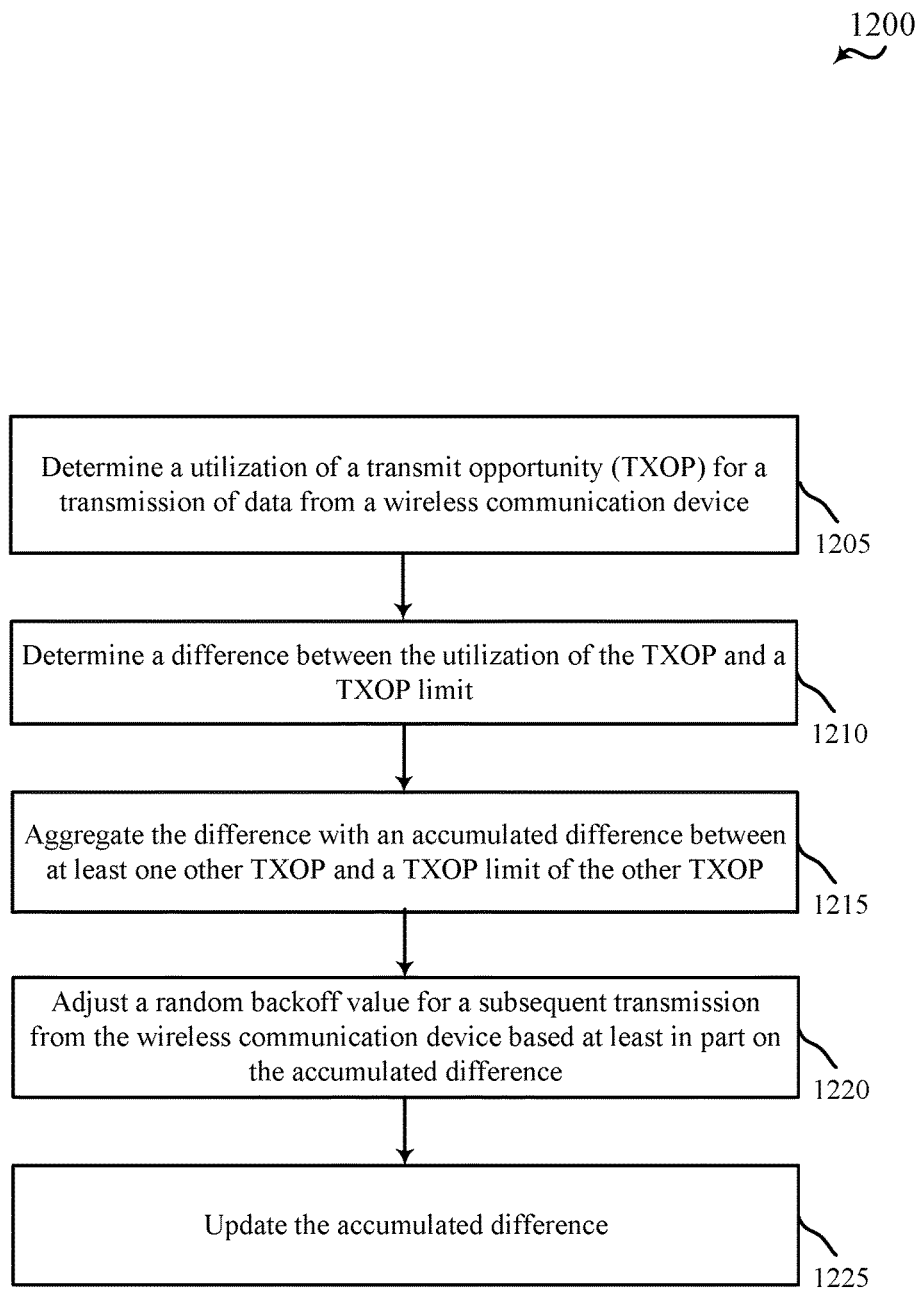
FIG. 12 is a flowchart of an example of a method for random backoff adjustment in a wireless communication system according to various examples.

Turning next to FIG. 12, another flow diagram is described for a method 1200 for random backoff adjustment based at least in part on TXOP utilization in accordance with various examples. The method 1200 may be implemented using, for example, the stations 115 of FIG. 1 or 6; APs 105 of FIG. 1 or 7, or devices 505, 530, or 550 of FIG. 5A, 5B, or 5C, for example. It should be understood, for example, that the CW adjuster 560 described with reference to FIG. 5C may be implemented as a backoff adjuster for the method 1200. At block 1205, an accumulated difference between a utilization of one or more transmit opportunities (TXOPs) for a transmission of data from a wireless communication device and a TXOP limit is determined. At block 1210, a relative excess between the accumulated difference and the TXOP limit is determined. At block 1215, a random backoff value is adjusted based at least in part on the relative excess. As described herein, the adjustment to the random backoff is based at least in part on the determined relative excess. For example, an offset based at least in part on the CW value and the relative excess is added to the random backoff. At block 1220, the accumulated difference is updated.

In an alternative embodiment, a new access category is created with a larger TXOP limit than the original access category, in which the CWmin and CWmax are scaled by the same number as the TXOP limit.

By way of illustration, consider the following exemplary set of access categories:

TABLE 10

| AC | CWmin | CWmax | AIFSN | TXOP limit |
|---|---|---|---|---|
| AC_VO | 3 | 7 | 1 | 2 ms |
| AC_VI | 7 | 15 | 1 | 3 ms |
| AC_BE | 15 | 63 | 3 | 5 ms |
| AC_BK | 15 | 1023 | 7 | 5 ms |

In the above table, "AC" refers to an access category, "CWmin" refers to the minimum contention window defined for each listed access category, "CWmax" refers to the maximum contention window defined for each listed access category, "AIFSN" refers to the arbitration interframe space number defined for each listed access category, and "TXOP" limit refers to the transmission opportunity limit defined for each listed access category. The access categories in Table 10 include a voice access category (AC_VO), a video access category (AC_VI), a best effort access category (AC_BE), and a background access category (AC_BK). CWmin, CWmax, and AIFSN are expressed in terms of backoff slots.

The set of access categories shown above in Table 10 can be supplemented with the addition of an extended TXOP limit access category for best effort traffic, access category AC_BE_long, as follows:

TABLE 11

| AC | CWmin | CWmax | AIFSN | TXOP limit |
|---|---|---|---|---|
| AC_VO | 3 | 7 | 1 | 2 ms |
| AC_VI | 7 | 15 | 1 | 3 ms |
| AC_BE | 15 | 63 | 3 | 5 ms |
| AC_BE_long | 31 | 127 | 3 | 10 ms |
| AC_BK | 15 | 1023 | 7 | 5 ms |

The new access category AC_BE_long has double the CWmin, double the CWmax and double the TXOP limit of the AC_BE class. AC_BE_long can be used in parallel with AC_BE and the other ACs, or a sequential switching can occur between AC_BE and AC_BE_long. In one example of sequential switching, traffic assigned to the AC_BE access category may be dynamically switched or reassigned to the AC_BE_long access category when a longer TXOP would be beneficial or more efficient. Conversely, traffic assigned to the AC_BE_long access category can be dynamically switched or reassigned to the AC_BE access category when a shorter TXOP would be beneficial or more efficient. In similar fashion, the parameters of AC_BE can be switched based on the expected duration of a pending TXOP, or based on the realized duration of a past TXOP (AC_BE parameters for a TXOP up to 5 ms, AC_BE_long parameters for a TXOP longer than 5 ms). In this way, there is an option for adjusting the TXOP limit for a particular class of traffic while maintaining fairness.

It will be understood that different or additional access categories may be added. For example, one or more of an AC_VO long access category, an AC_VI long access category, or an AC_BK_long access category can be added to the Table 11. Each of the "long" access categories can have a CWmin, a CWmax, and a TXOP limit that are scaled from the respective values defined for the corresponding "normal" access category by the same amount. This scalar amount can be different for different pairs of normal and long access categories, or the scalar amount can be the same for all pairs of normal and long access categories.

The set of access categories shown in Table 10 can additionally or alternatively be supplemented with the addition of a reduced TXOP limit access category according to the same principles described above with respect to extended TXOP limit access categories. For example, a new reduced TXOP limit access category for best effort traffic can be defined, e.g., access category AC_BE short, in which the CWmin, CWmax, and TXOP limit of the AC_BE access category are all reduced by half.

In an alternative embodiment, the maximum TXOP length for an access category is determined randomly based on a given random probability distribution. The distribution may be fixed or dynamic. In the case of a fixed random probability distribution, multiple possible maximum TXOP lengths are defined for the access category, and a probability of being assigned each possible maximum TXOP length is fixed or semi-statically set. In one example of a fixed distribution, the maximum TXOP length is randomly chosen with a 50% probability of being 10 ms and a 50% probability of being 6 ms. In another example of a fixed distribution, the maximum TXOP length is randomly chosen with a 50% probability of being 10 ms and a 50% probability of being 0 ms, with a value of 0 ms implying that no transmission occurs for the current contention window and a new backoff is started by the device.

In the case of a dynamic random probability distribution, the distribution is modulated by, for example, an average or actual contention window size. In one example of a modulated distribution, the maximum TXOP length is randomly chosen as either 10 ms or a shortened maximum TXOP length (e.g., 6 ms or 0 ms), with the probability of a 10 ms maximum TXOP length being given as P(10 ms)= −0.0257*average or actual CW+1.3857 (bounded by 0 and 1). This exemplary modulated distribution lets the probability for a 10 ms TXOP limit vary between 100% at an average CW of 15 and 10% at an average CW of 50. In this way, the amount of 10 ms TXOPs can be moderated based on channel occupancy. An advantage of selecting the TXOP limit based on a random distribution is that the TXOP limit distribution on the channel will be independent of the number of nodes deploying the TXOP limit adaptation mechanism.

In an alternative embodiment, the backoff after a TXOP with duration less than 6 ms can be determined using, e.g., subsequent contention window values 15, 31, 63, and 127, respectively, where each subsequent value can be selected when a collision is inferred. For TXOPs with a duration longer than 6 ms, the backoff can be determined using, e.g., contention window values 15, 31, 63, and 127, multiplied by the realized duration of the TXOP divided by 6 ms. For example, for a realized TXOP of 10 ms, the subsequent contention window values are 25, 52, 105, 212. Generally, when the TXOP duration exceeds the TXOP limit duration each CW can be multiplied by TXOP duration divided by the TXOP limit duration. For exponential backoff, this can be noted as follows:

$$CW = (2^{n+4} - 1) * \max\left(\frac{TXOP\ duration}{TXOP\ limit\ duration}, 1\right) \quad (Eq.\ 17)$$

where n is the retry count, starting at 0 for the initial transmission. For traffic with a different priority, the starting value for the initial transmission can depend on a priority value p as follows:

$$CW = (2^{(n+p)} - 1) * \max\left(\frac{TXOP\ duration}{TXOP\ limit\ duration}, 1\right) \quad (Eq.\ 18)$$

with, e.g., p=4 for best effort traffic, p=3 for video traffic, and p=2 for voice traffic. However, variations may also exist, such as different p values for traffic classes.

The detailed description set forth above in connection with the appended drawings describes exemplary examples and does not represent the only examples that may be implemented or that are within the scope of the claims. The term "exemplary" when used in this description means "serving as an example, instance, or illustration," and not "preferred" or "advantageous over other examples." The detailed description includes specific details for the purpose of providing an understanding of the described techniques. These techniques, however, may be practiced without these specific details. Well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   determining a utilization of a transmit opportunity (TXOP) for a transmission of data from a wireless communication device;
   determining a difference between the utilization of the TXOP and a TXOP limit;
   aggregating the difference with an accumulated difference between at least one other TXOP and a TXOP limit for the at least one other TXOP;
   determining a relative excess between the accumulated difference and the TXOP limit; and
   adjusting a contention window value for a subsequent transmission from the wireless communication device based at least in part on the relative excess.

2. The method of claim 1, further comprising:
   updating the accumulated difference based at least in part on the adjusted contention window value.

3. The method of claim 1, further comprising:
   updating the accumulated difference based at least in part on a realized TXOP time obtained using the adjusted contention window value.

4. The method of claim 1, further comprising:
   updating the accumulated difference based at least in part on the adjustment to the contention window value.

5. The method of claim 1, wherein adjusting the contention window value further comprises:
   scaling the contention window value based at least in part on the relative excess.

6. The method of claim 5, wherein scaling the contention window value further comprises:
   multiplying the contention window value by a ratio that is based at least in part on the relative excess.

7. The method of claim 1, wherein the contention window value is adjusted by linearly increasing the contention window value.

8. The method of claim 7, wherein linearly increasing the contention window value comprises:
   multiplying the relative excess by the contention window value; and
   rounding down to a next integer contention window value.

9. The method of claim 1, wherein adjusting the contention window value comprises:
decreasing the contention window value when the accumulated difference is less than a predetermined value.

10. The method of claim 9, wherein the predetermined value is determined based at least in part on a ratio of the accumulated difference and the TXOP limit.

11. The method of claim 10, wherein decreasing the contention window value comprises:
multiplying the ratio by the contention window value; and
rounding down to a next integer contention window value.

12. The method of claim 1, wherein adjusting the contention window value comprises:
increasing the contention window value to allow for increased utilization of a subsequent TXOP relative to the TXOP limit.

13. The method of claim 1, further comprising:
adjusting a random backoff value for the subsequent transmission from the wireless communication device based at least in part on the accumulated difference.

14. The method of claim 13, wherein adjusting the random backoff value comprises:
adding an offset to the random backoff value.

15. The method of claim 1, further comprising:
determining a second utilization of a subsequent TXOP during a subsequent transmission of data from the wireless communication device;
determining a second difference between the second utilization of the subsequent TXOP and the TXOP limit for the subsequent TXOP;
secondly aggregating the second difference with the accumulated difference.

16. A communications device for wireless communications, comprising:
a memory that stores instructions; and
a processor coupled with the memory, wherein the processor and the memory are configured to:
determine a utilization of a transmit opportunity (TXOP) for a transmission of data from a wireless communication device and determine a difference between the utilization of the TXOP and a TXOP limit;
aggregate the difference with an accumulated difference between at least one other TXOP and a TXOP limit for the at least one other TXOP;
determine a relative excess between the accumulated difference and the TXOP limit; and
adjust a contention window value for a subsequent transmission from the wireless communication device based at least in part on the relative excess.

17. The communications device of claim 16, wherein the processor and the memory are configured to:
update the accumulated difference based at least in part on the adjusted contention window value.

18. The communications device of claim 16, wherein the processor and the memory are configured to:
update the accumulated difference based at least in part on a realized TXOP time obtained using the adjusted contention window value.

19. The communications device of claim 16, wherein the processor and the memory are configured to:
update the accumulated difference based at least in part on the adjustment to the contention window value.

20. The communications device of claim 16, wherein the processor and the memory are configured to:
adjust the contention window value when the relative excess is greater than a predetermined value.

21. The communications device of claim 16, wherein the processor and the memory are configured to:
adjust the contention window value after a predetermined number of TXOPs.

22. The communications device of claim 16, wherein the processor and the memory are configured to:
adjust the contention window value such that an average TXOP time is within the TXOP limit.

23. The communications device of claim 16, wherein the processor and the memory are configured to adjust the contention window value by being configured to:
scale the contention window value based at least in part on the relative excess.

24. The communications device of claim 23, wherein the processor and the memory are configured to scale the contention window value by being configured to:
multiply the contention window value by a ratio that is based at least in part on the relative excess.

25. A communications device for wireless communications, comprising:
means for determining a utilization of a transmit opportunity (TXOP) for a transmission of data from a wireless communication device;
means for determining a difference between the utilization of the TXOP and a TXOP limit;
means for aggregating the difference with an accumulated difference between at least one other TXOP and a TXOP limit for the at least one other TXOP;
means for determining a relative excess between the accumulated difference and the TXOP limit; and
means for adjusting a contention window value for a subsequent transmission from the wireless communication device based at least in part on the relative excess.

26. A non-transitory computer-readable medium comprising computer-readable code that, when executed, causes a device to:
determine a utilization of a transmit opportunity (TXOP) for a transmission of data from a wireless communication device;
determine a difference between the utilization of the TXOP and a TXOP limit;
aggregate the difference with an accumulated difference between at least one other TXOP and a TXOP limit for the at least one other TXOP;
determine a relative excess between the accumulated difference and the TXOP limit; and
adjust a contention window value for a subsequent transmission from the wireless communication device based at least in part on the relative excess.

27. The method of claim 1, wherein adjusting the contention window value comprises:
adjusting the contention window value when the relative excess is greater than a predetermined value, or after a predetermined number of TXOPs, or a combination thereof.

28. The method of claim 1, wherein adjusting the contention window value comprises:
adjusting the contention window value such that an average TXOP time is within the TXOP limit.

29. The communications device of claim 16, wherein the processor and the memory are configured to adjust the contention window value by being configured to:
linearly increase the contention window value.

30. The communications device of claim 29, wherein the processor and the memory are configured to linearly increase the contention window value by being configured to:
   multiply the relative excess by the contention window value; and
   round down to a next integer contention window value.

* * * * *